(12) United States Patent
Ott et al.

(10) Patent No.: US 11,635,760 B2
(45) Date of Patent: Apr. 25, 2023

(54) AUTONOMOUS PATH TREATMENT SYSTEMS AND METHODS

(71) Applicant: Left Hand Robotics, Inc., Longmont, CO (US)

(72) Inventors: Michael John Ott, Longmont, CO (US); Clinton James Ott, Tucson, AZ (US); Zachary Dax Olkin, Niwot, CO (US); Terry Michael Olkin, Niwot, CO (US)

(73) Assignee: The Toro Company, Bloomington, MN (US)

( * ) Notice: Subject to any disclaimer, the term of this patent is extended or adjusted under 35 U.S.C. 154(b) by 277 days.

(21) Appl. No.: 16/898,208

(22) Filed: Jun. 10, 2020

(65) Prior Publication Data

US 2020/0310432 A1    Oct. 1, 2020

Related U.S. Application Data

(63) Continuation of application No. 15/808,274, filed on Nov. 9, 2017, now abandoned.
(Continued)

(51) Int. Cl.
 *G05D 1/02* (2020.01)
 *G05D 1/00* (2006.01)
 *E01H 5/09* (2006.01)

(52) U.S. Cl.
 CPC .......... *G05D 1/0088* (2013.01); *E01H 5/092* (2013.01); *G05D 1/0011* (2013.01);
 (Continued)

(58) Field of Classification Search
 CPC .. G05D 1/0088; G05D 1/0011; G05D 1/0212; G05D 1/0214; G05D 2201/0203;
 (Continued)

(56) References Cited

U.S. PATENT DOCUMENTS

| 6,173,904 B1 | 1/2001 | Doherty et al. |
| 7,010,425 B2 | 3/2006 | Gray et al. |

(Continued)

FOREIGN PATENT DOCUMENTS

| WO | 2016098023 A2 | 6/2016 |
| WO | WO 2016/098023 A2 | 6/2016 |

OTHER PUBLICATIONS

International Search Report of PCT/US2017/060882 dated Jan. 17, 2018, 2 pp.
(Continued)

*Primary Examiner* — Masud Ahmed
(74) *Attorney, Agent, or Firm* — Lathrop GPM LLP

(57) ABSTRACT

An autonomous path treatment system and associated path treatment method uses a mobile path recording device having a locator, a processor and firmware to capture a sequence of coordinates and directions of travel of a path as the mobile device is moved along the path and generate a path program file. The system also has an autonomous path treatment robot having: a treatment mechanism for treating the path; a controller having a processor and memory storing firmware that when executed obeys steps of the path program file to control the motor and the treatment mechanism to treat the path; and a server configured to execute a path program to process the captured sequence of coordinates and directions into the path program file containing instructions for controlling the autonomous path treatment robot to treat the path based upon the coordinates.

19 Claims, 14 Drawing Sheets

Related U.S. Application Data

(60) Provisional application No. 62/425,571, filed on Nov. 22, 2016.

(52) U.S. Cl.
CPC ......... *G05D 1/0212* (2013.01); *G05D 1/0214* (2013.01); *G05D 2201/0203* (2013.01); *G05D 2201/0213* (2013.01)

(58) Field of Classification Search
CPC ... G05D 2201/0213; G05D 2201/0201; G05D 1/0221; G05D 1/0297; E01H 5/092
USPC ....................................................... 700/245
See application file for complete search history.

(56) References Cited

U.S. PATENT DOCUMENTS

| | | | |
|---|---|---|---|
| 8,605,947 | B2 | 12/2013 | Zhang et al. |
| 9,085,859 | B2 | 7/2015 | Andic |
| 9,194,091 | B2 | 11/2015 | Moon, Jr. et al. |
| 9,554,508 | B2 | 1/2017 | Balutis et al. |
| 9,573,275 | B2 | 2/2017 | Reigo et al. |
| 9,720,417 | B2 | 8/2017 | Reigo et al. |
| 9,826,678 | B2 | 11/2017 | Balutis et al. |
| 10,159,180 | B2 | 12/2018 | Balutis et al. |
| 10,362,913 | B2* | 7/2019 | Gatter ................... A47L 9/2805 |
| 10,390,483 | B2 | 8/2019 | Balutis et al. |
| 10,433,697 | B2* | 10/2019 | Lindhé ................... A47L 9/2852 |
| 10,598,793 | B2 | 3/2020 | Ohrlund et al. |
| 10,646,997 | B2 | 5/2020 | Reigo et al. |
| 10,777,000 | B2 | 9/2020 | Grufman et al. |
| 10,806,075 | B2 | 10/2020 | Grufman et al. |
| 10,849,267 | B2 | 12/2020 | Strandberg et al. |
| 2009/0281661 | A1* | 11/2009 | Dooley ............... B60L 15/2036 901/1 |
| 2014/0124004 | A1* | 5/2014 | Rosenstein .......... G05D 1/0219 15/3 |
| 2014/0180478 | A1 | 6/2014 | Letsky |
| 2015/0088310 | A1* | 3/2015 | Pinter ................... B25J 9/1676 901/1 |
| 2015/0254986 | A1 | 9/2015 | Fairfield et al. |
| 2016/0091898 | A1* | 3/2016 | Booher ................ G05D 1/0219 701/26 |
| 2016/0201278 | A1* | 7/2016 | Happonen ............... A47L 11/24 15/353 |
| 2016/0318516 | A1* | 11/2016 | Tuukkanen ...... G08G 1/096838 |
| 2016/0325435 | A1* | 11/2016 | Svensson Landin ... H04L 63/10 |
| 2017/0049288 | A1* | 2/2017 | Knutson ............. A47L 11/4036 |
| 2017/0127608 | A1* | 5/2017 | Biber ................... G05D 1/0255 |
| 2017/0129297 | A1* | 5/2017 | Björn ...................... B60L 53/14 |
| 2017/0168499 | A1* | 6/2017 | Björn .................... A01D 34/008 |
| 2017/0265703 | A1* | 9/2017 | Park .......................... B25J 9/16 |
| 2017/0344024 | A1* | 11/2017 | Grufman ............. A01D 34/008 |
| 2018/0213717 | A1* | 8/2018 | Jägenstedt ............. G05D 1/021 |
| 2018/0255705 | A1* | 9/2018 | Keski-Luopa ....... A01D 34/008 |
| 2018/0327183 | A1* | 11/2018 | Peek ........................ B65F 3/14 |
| 2019/0033865 | A1* | 1/2019 | Ewert .................. G05D 1/0088 |

OTHER PUBLICATIONS

International Preliminary Report on Patentability of PCT/US2017/060882 dated Nov. 2, 2018, 17 pp.

European Patent Application No. 17874466.0, Communication pursuant to Rule 164(1) EPC dated Jul. 10, 2020, 15 pages.

European Patent Application No. 17874466.0, Extended Search and Opinion dated Nov. 9, 2020, 16 pages.

EP Application No. 17874466.0, EPO Office Action dated Sep. 30, 2022, 4 pages.

* cited by examiner

AUTONOMOUS PATH TREATMENT SYSTEMS AND METHODS

CROSS REFERENCE TO RELATED APPLICATIONS

This application is a continuation of U.S. application Ser. No. 15/808,274, filed Nov. 9, 2017, which claims the benefit of U.S. Provisional Application No. 62/425,571, filed Nov. 22, 2016. The contents of all priority Applications are incorporated herein by reference in their entirety.

BACKGROUND

Clearing snow is tedious, difficult, and labor intensive. In most commercial settings, snow should be removed within certain time constraints. In Zero Tolerance Locations—such as hospitals, urgent care centers, 24-hour stores, and schools, —the clearing of snow must begin as soon as the first flakes fall.

The methods used today to clear the snow involve a combination of human driven vehicles including trucks with plows or other snow removal attachments, human driven machines including snow throwers, snow blowers, push-behind snow plows, and manual shoveling. Large vehicles equipped with plows are typically used in large areas such as parking lots, streets and driveways that large vehicles can access easily. Smaller snow clearing machines are typically used where large vehicle plows cannot access, such as sidewalks, walking paths, and near edges of streets and parking lots where obstacles (such as walls, edging, or curbs) are present. In places inaccessible to snow clearing machines, manual shoveling is used. Shoveling is by far the slowest method of snow clearing and is the most difficult for which to find labor. Since many people are sometimes needed to shovel, it is also the most expensive service to supply over a long period of time.

For a snow removal services company that use manual labor to remove snow, there are many problems including: (a) hiring, training and managing laborers who will be needed to clear snow; (b) transporting laborers to multiple job sites at needed times (possibly in the middle of the night); (c) securing and maintaining proper insurance coverage for both the laborers and as work-service warranties; and (d) dealing with injuries that may occur as laborers remove snow.

SUMMARY

In an embodiment, an autonomous path treatment system and associated path treatment method uses a mobile path recording device with locator, processor and firmware to capture a sequence of coordinates and directions of travel of a path as the mobile device is moved along the path. The system has an autonomous path treatment robot having a treatment mechanism for treating the path, a controller with processor and memory storing firmware that when executed obeys steps of a path program file to control the motor and the treatment mechanism to treat the path. The system also has a server configured to execute a path program compiler to transform the recorded sequence of coordinates and directions into the path program file of instructions for controlling the autonomous path treatment robot to treat the path based upon the coordinates.

In an embodiment, a method for autonomously treating a path includes receiving, within a computer server, coordinates and directions of travel defining the path from a mobile device adapted with sensors to detect obstacles and generating, based upon the coordinates and directions of travel, a path program for controlling an autonomous path treatment robot to autonomously treat the path. The method continues with sending the path program to control the autonomous path treatment robot to treat the path; receiving status information from the autonomous path treatment robot during treatment of the path; and generating documentation indicative of the path treatment by the autonomous path treatment robot based upon the status information.

In another embodiment, a method for autonomously treating a path includes, receiving within a computer server, coordinates and directions of travel defining the path from a laptop or workstation equipped with a mapping and path designation program operable with aerial photographs of a site to designate a path. The method continues with sending the path program to control the autonomous path treatment robot to treat the path; receiving status information from the autonomous path treatment robot during treatment of the path; and generating documentation indicative of the path treatment by the autonomous path treatment robot based upon the status information. In particular embodiments the aerial photographs are obtained through a drone, helicopter, fixed-wing aircraft, or reconnaissance satellite, and registered with markers to known GPS coordinates.

In another embodiment, an autonomous path treatment system includes a mobile path recording device having a locator, a processor and a memory storing machine readable instructions executable by the processor to capture, using the locator, a sequence of coordinates and directions of travel of a path to be treated as the mobile device is moved along the path by an operator. The system also includes an autonomous path treatment robot having a motor for maneuvering the robot along the path; a treatment mechanism for treating the path; a controller having a processor and memory storing machine readable instructions that when executed by the processor obeys steps of a path program to control the motor and the treatment mechanism to treat the path. The system also includes a server having been configured to generate the path program from a recorded sequence of coordinates and instructions, the path program comprising instructions for controlling the autonomous path treatment robot to treat the path based upon the coordinates; the server configured to: send the path program to the autonomous path treatment robot; receive the status information from the autonomous path treatment robot via the wireless interface as the autonomous path treatment robot treats the path; and generate a web-based dashboard illustrating a status of the autonomous path treatment robot based upon the status information.

In another embodiment, an autonomous path treatment robot for treating a path, includes a motor driving at least one wheel to maneuver the autonomous path treatment robot along the path; a path treatment device positioned ahead of the motor and wheel for treating the path; a wireless interface for receiving, from a remote server, a path program that includes a sequence of directives; and a controller having a processor and memory storing machine readable instructions that are executed by the processor to cooperatively control the motor and the rotating brush to treat the path based upon the sequence of directives.

DETAILED DESCRIPTION OF THE EMBODIMENTS

With the versatile autonomous path treatment system described below, many, if not all, of the disadvantages and problems associated with prior art snow removal are addressed. Part of this autonomous path treatment system is its robot, one that may be activated as needed, at any time, or preprogrammed to ensure paths and walkways are clear by a defined time.

Although examples described herein describe a robot sized specifically for paths and walkways, the robot may be scaled for other situations including those where prior art snow removal solutions such as large, plow-equipped, vehicles are viable. Using the robot described herein may provide certain advantages, including: labor cost reduction, insurance cost reduction, reduction in number or need of manual laborers used in snow removal, reduced physical stress or injury during snow removal, reduced time to clear snow at a given site, snow clearing available 24 hours 7 days a week, and reduced overall cost of clearing snow. At large sites, multiple robots may be deployed and activated simultaneously. Other advantages may become apparent in the description below.

Figure 1:
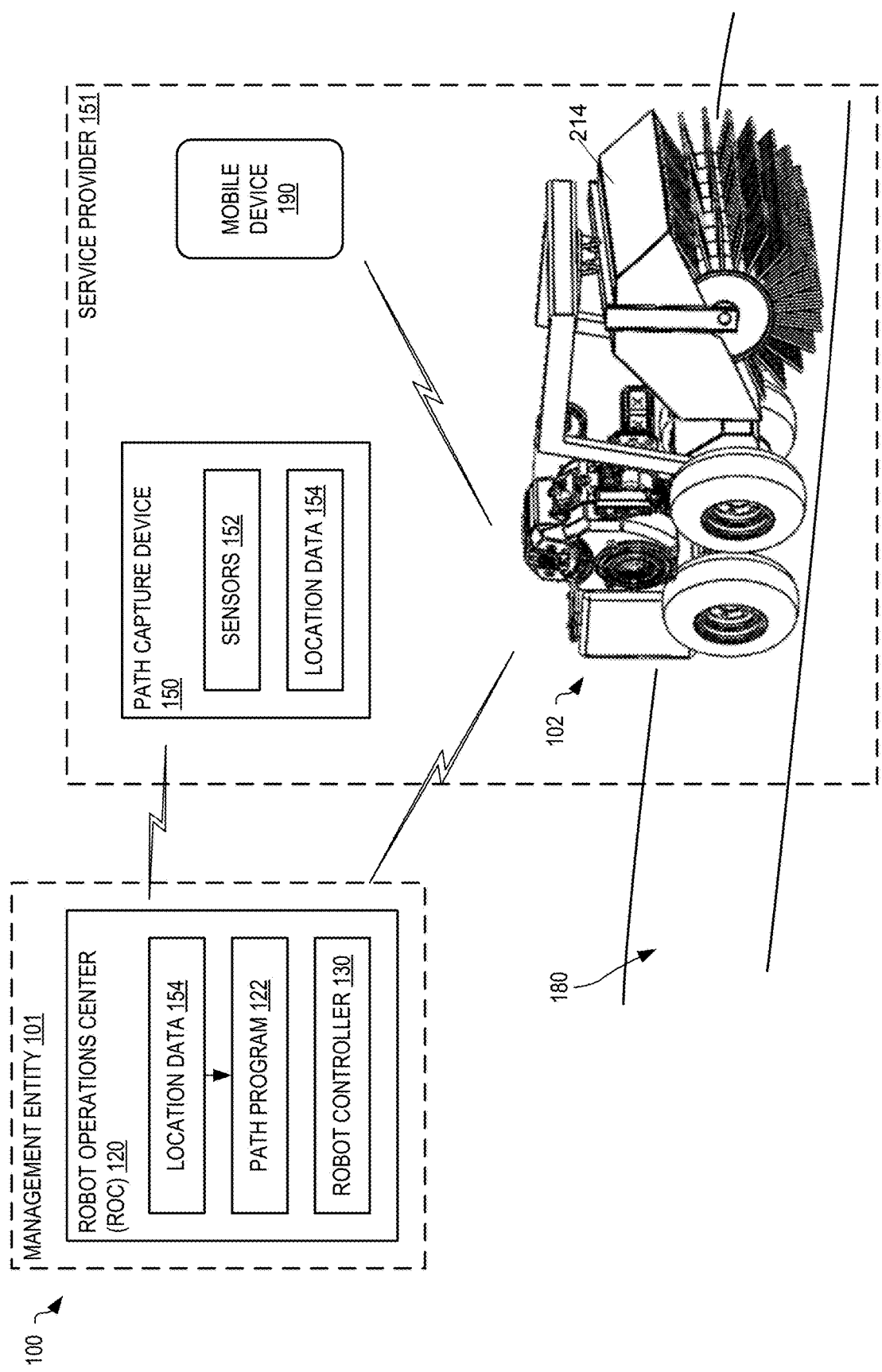
FIG. 1 shows one exemplary autonomous path treatment system, in an embodiment.

FIG. 1 shows one autonomous path treatment system 100 that includes an autonomous path treatment robot 102. A path capture device 150 utilizes multiple sensors 152 to capture location data 154 of a path 180 to be treated. In embodiments, both the autonomous path treatment robot 102 and path capture device 150 employ several navigation sensors 152 that may include: global positioning system (GPS) which may be Wide Area Augmentation System (WAAS) enhanced, magnetometers, accelerometers and speedometers, and gyroscopes. For obstacle detection, both the autonomous path treatment robot 102 and path capture device 150 employ sensors that may include: RADAR, LIDAR, thermal imaging cameras, visual-wavelength color cameras, and ultrasonic sensors adapted to detect a texture as well as presence of obstacles. Path capture device 150 records location data 154 as path capture device 150 traverses over path 180. Path capture device 150 sends location data 154 to a robot operations center (ROC) 120 where it is processed by a robot controller 130 to generate a path program 122. Path program 122 includes a sequence of directives, such as movement directives with coordinates defining locations along path 180 and control directives for controlling components of robot 102 that are followed by robot 102 to treat path 180. For example, path program 122 may include operational directives such as direction of discharge of cleared snow such as by changing an angle of a snow thrower nozzle, an angle of a brush or blade used within clearing mechanism 214, or an angle of another slow clearance device. Path program 122 may also include operational directives controlling operation of various additional features such as lights, rotation of a clearing brush, operation of treatment applicator 220, and operation of an aural warning and/or communications system. ROC 120 and robot 102 communicate wirelessly using one or more of a cellular carrier, Wi-Fi, the Internet, Bluetooth, and so on.

In embodiments, location data 154 includes global positioning system (GPS) coordinates, orientation in the Earth's magnetic field, and maximum speeds. In addition, location data 154 includes one or more of RADAR, LIDAR, and ultrasonic ranges to nearby obstacles as well as textures of obstacles recorded with each coordinate along the path to be treated.

Figure 2:
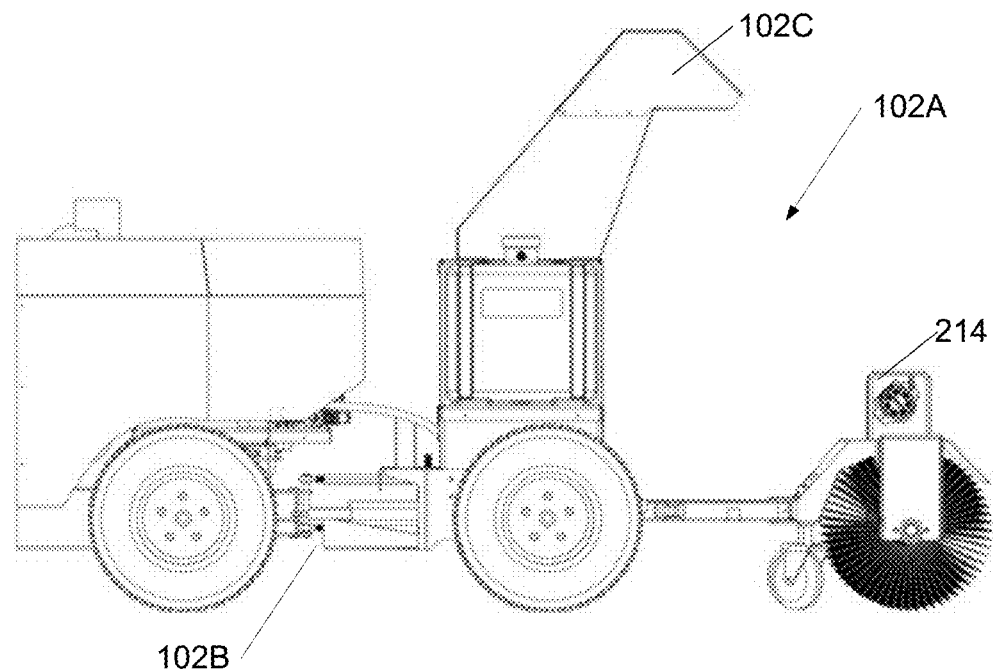
FIG. 2 illustrates an alternative embodiment of the autonomous path treatment robot of FIG. 1 having an articulated steering system.
Figure 3:
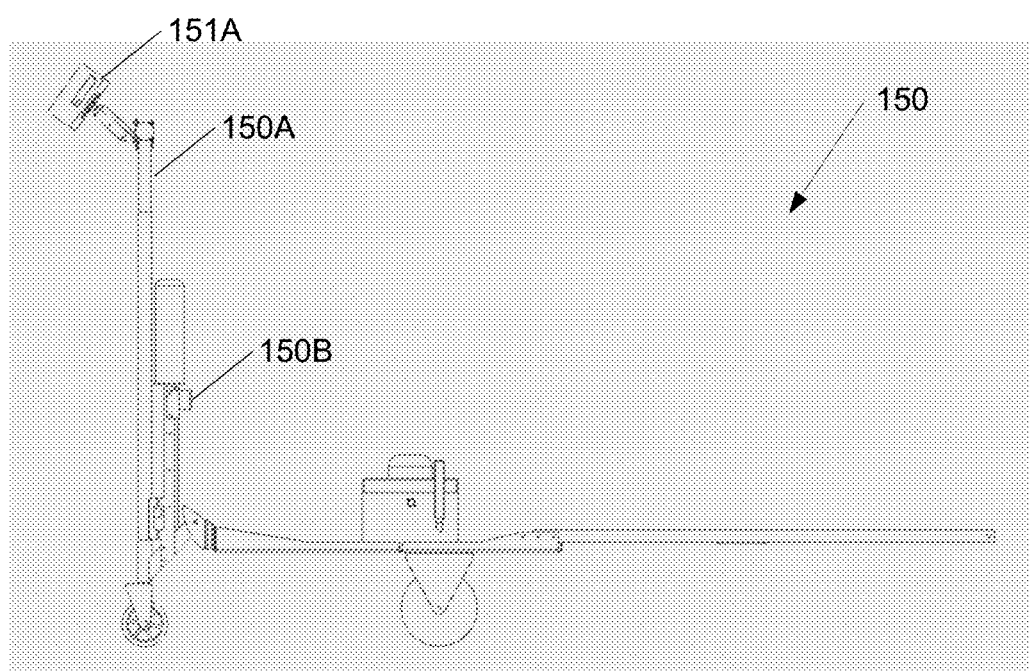
FIG. 3 illustrates a path capture device for use with the autonomous path treatment system of FIG. 1.

In an alternative embodiment illustrated by viewing FIGS. 2 and 3, the path treatment robot 102 operated in a manually controlled mode operates as a path capture device to capture location data 154 of path 180. In some embodiments, the thermal and color cameras of the path treatment robot 102 are mounted on a sensor tower 102C (FIG. 2), and corresponding color cameras 150B of the path capture device 150 are mounted on a sensor pole 150A. In contrast, the ultrasonic sensors may be mounted low on each front and rear corner of robot 102 and path capture device 150. Path capture device 150 also has a touchscreen display 151A that permits user interaction with electronics of the path capture device.

Figure 4:
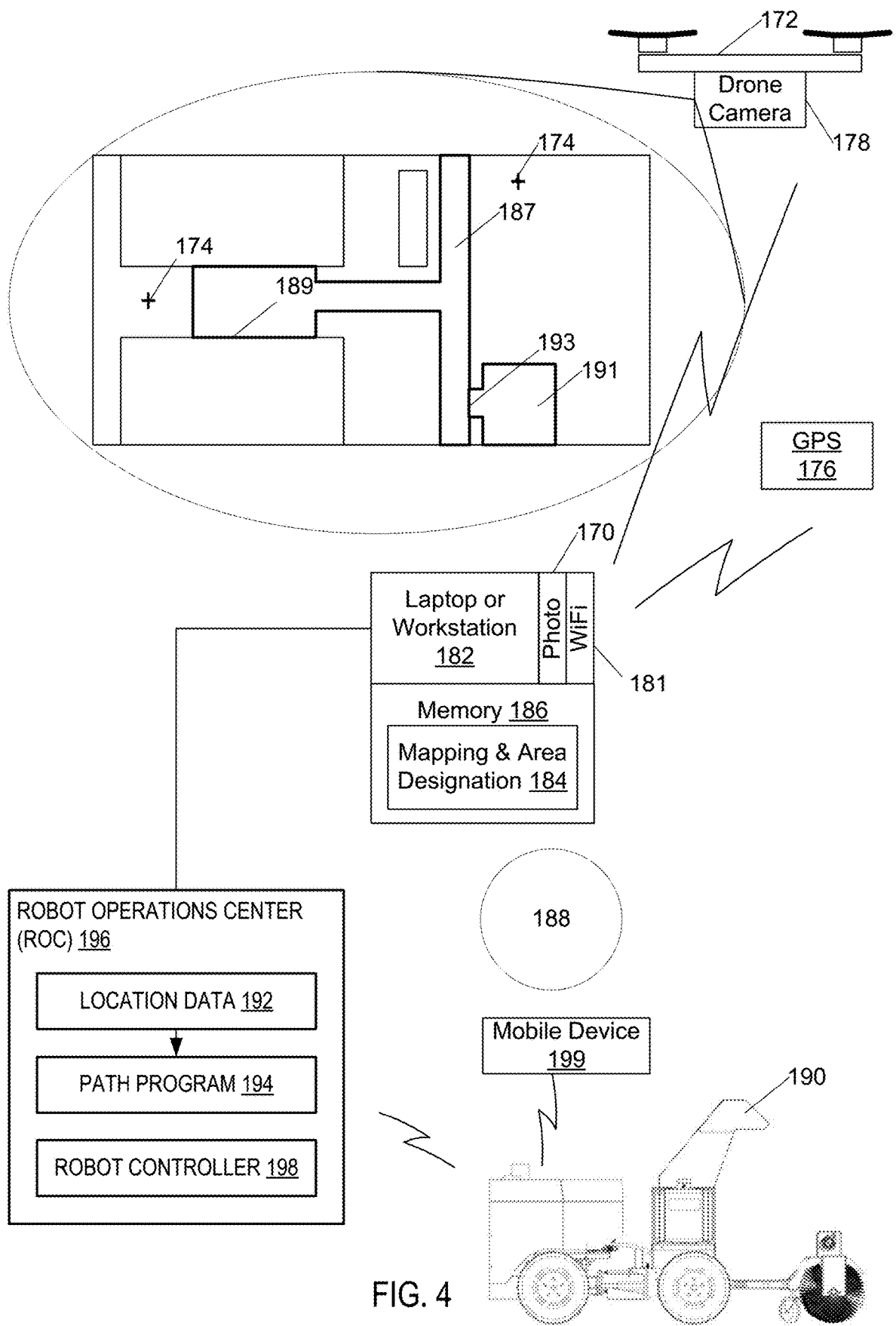
FIG. 4 is a schematic illustration of an alternative path capture system utilizing registered, calibrated aerial photographs, with a path designation and mapping software to designate paths and areas to be treated.

In an alternative embodiment, instead of or in addition to paths captured with path capture device 150, paths are captured in other ways such as by using digital aerial photographs 170 (FIG. 4) with a computer workstation. In this embodiment, aerial photographs from commercial satellite coverage may be used. Where satellite photographs have inadequate resolution, are outdated, are cloud-obscured, or otherwise are inadequate, aerial photographs from other sources are used. Other sources of aerial photographs may include photographs taken from fixed-wing aircraft, helicopters, or by a camera-equipped drone 172. A camera-equipped drone may in some cases permit obtaining adequate aerial photographs despite tall buildings and trees that may obstruct views from higher-flying aircraft or satellites. In an example using a drone 172, at least two visible markers 174 are positioned on a site and precisely located with a GPS 176, markers 174 may be the white "X" markers often used in aerial photography or may be any other object readily identifiable in an aerial photograph such as a corner of a planter or corner of a sidewalk. The drone is then flown over the site at a constant altitude and photographs are obtained with a drone-mounted camera 178, these photographs are transmitted via an IEEE 802.11 Wi-Fi port 181 of a laptop or workstation computer 182. Where both markers 174 and the entire site are not shown on a single frame, individual frames are stitched to generate a photo 170 showing the entire site and markers. The markers 174 are located on photo 170 and their previously obtained GPS coordinates are used to register the photo 170 to GPS coordinates and calibrate the photo 170 so precise locations and distances can be measured from photo 170.

The laptop or workstation computer 182 then executes a mapping, path, and area designation software 184 in memory 186 of laptop or workstation computer 182, the mapping, path, and area designation software 184 detects edges on photo 170 and is then used by an operator 188 to designate on photo 170 areas and paths at the site that are to be treated such as sidewalks 187, building entranceways 189, handicapped parking places 191 and interconnecting paths such as a curb cutout 193 where robot 190 can safely transition from sidewalk 187 to parking spaces 191. The mapping, path, and area designation software 184 then provides location data 192 to path program 194 at ROC 196 so path program 194 can generate detailed paths that can be transmitted by robot controller 198 of ROC 196 to robot 190 for treating the areas and paths to be treated.

Once the detailed paths are identified, a trial run of robot 190 is conducted during which robot 190 obtains additional path data, such as one or more of RADAR, LIDAR, and ultrasonic ranges to nearby obstacles as well as textures of obstacles recorded with each, this trial run may in some particular embodiments be performed under observation by operator 188 who may use a mobile device 199 to resolve robot stoppages due to obstacles and control and adjust paths traversed by the robot. The detailed paths, as annotated with additional path data, are then stored for use during autonomous robot operation.

Figure 5:
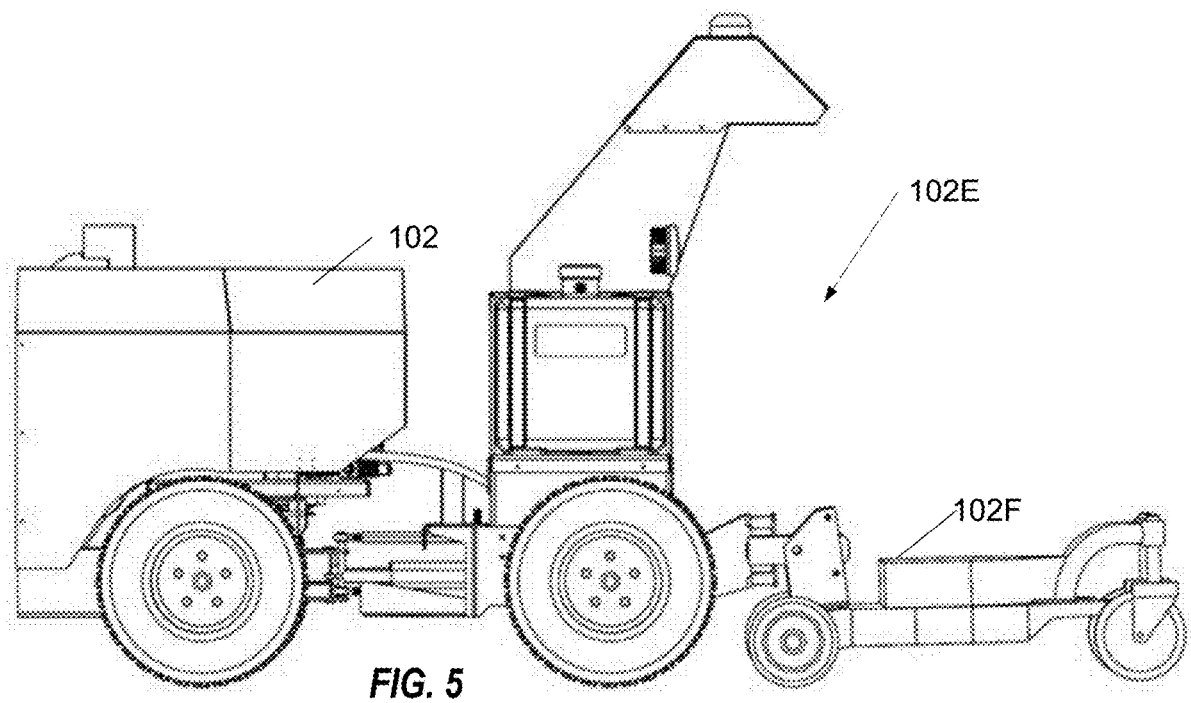
FIG. 5 illustrates an exemplary autonomous path treatment robot having a mower attachment in place of a snow-removal device, in an embodiment.
Figure 6:
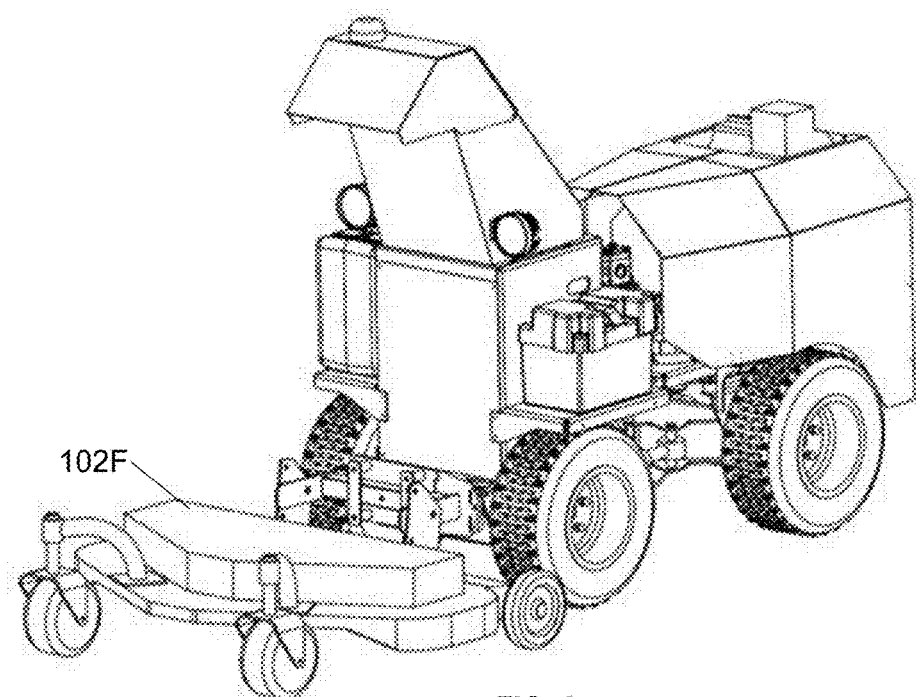
FIG. 6 is a perspective view of the embodiment with mower attachment illustrated in FIG. 5.

In an alternative embodiment, snow removal path treatment apparatus of robot 102 is removable and, as illustrated in FIG. 5 and FIG. 6, robot 102E may be equipped with a removable multiple-rotor mulching rotary mower deck 102F. In this embodiment, robot 102E may be used for summer mowing of grassy paths or grass-covered areas in addition to winter snow removal operations.

System 100 may be operated by one or more entities, and is illustratively shown with a management entity 101 operating ROC 120 and a service provider 151 that operates path capture device 150 and autonomous path treatment robot 102 to provide a clearing service along path 180 at a service location for a third party. Accordingly, service provider 151 may purchase, lease, or rent robot 102 from management entity 101 (or from another entity) or be contracted by the third party to provide the path treatment service at the service location. Service provider 151 then contracts with management entity 101 to control robot 102 to perform the path treatment service at each service location. Service provider 151 may be contracted by multiple parties to provide service at multiple service locations without departing from the scope hereof. In certain scenarios, a single entity may provide both management and service to the third party.

The Robot

Figure 7:
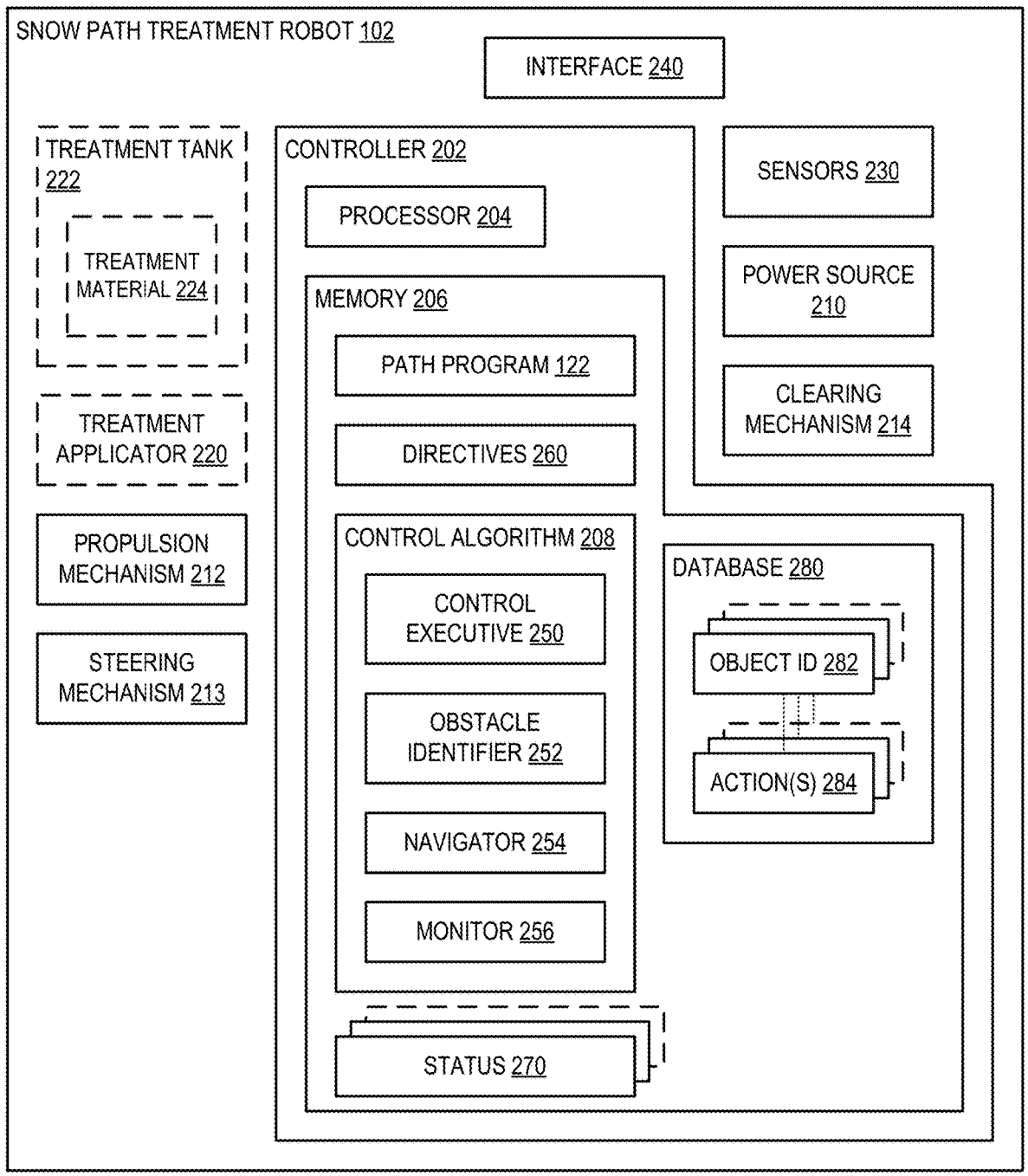
FIG. 7 is a schematic showing components of the robot of the autonomous path treatment system of FIG. 1, in an embodiment.

FIG. 7 is a schematic showing exemplary components of robot 102 of autonomous path treatment system 100 of FIG. 1. Robot 102 includes a power source 210 that, for example, incorporates one or more of an internal combustion engine, battery, and a fuel cell. When power source 210 includes an on-board battery, that battery may be charged from an internal combustion engine of power source 210. In an alternative embodiment, upon completion of clearing a path the robot 102 is configured to return to, and position its rear end in, a docking station (not shown) adapted to charge the on-board battery by induction. In this alternative embodiment, line AC power is provided to a charging electronics module that, when the robot is present, drives at high frequency a first coil positioned near the rear end of the robot; when the robot's rear end is positioned near the coil a second coil in the rear end of the robot is inductively coupled to the first coil and picks up high frequency power that is then rectified for charging the on-board battery of the robot.

Robot 102 also includes a propulsion mechanism 212 that receives power from power source 210 to propel and maneuver robot 102. In one embodiment, propulsion mechanism 212 includes a drivetrain with four wheels. In another embodiment, propulsion mechanism 212 includes two caterpillar tracks. Robot 102 includes a steering mechanism 213. In an embodiment, illustrated in FIG. 1, the steering mechanism 213 is a skid-steer system that steers the robot by differential operation of propulsion mechanism 212 on opposing sides of robot 102. In an alternative embodiment, illustrated in FIG. 2, robot 102A is articulated having a pivoting coupling 102B between front and rear portions of robot 102A with a hydraulically operated mechanism configured to rotate the front portion of robot 102A about the pivot relative to the rear portion of robot 102A. Robot 102 also includes a clearing mechanism 214 that receives power from power source 210 to clear snow from path 180. In one embodiment, clearing mechanism 214 is a spinning, cylindrical, brush that is positioned in front of propulsion mechanism 212 and moved by propulsion mechanism 212. In another embodiment, clearing mechanism 214 is a blade. In another embodiment, clearing mechanism 214 is a snow blowing device. The mounting of clearing mechanism 214 allows pivoting of clearing mechanism 214 along a central, vertical axis (perpendicular to the ground), relative to propulsion mechanism 212 and/or a main chassis of robot 102. This pivoting allows clearing mechanism 214 to operate at an angle relative to a direction of motion of propulsion mechanism 212 (and hence motion of robot 102), as may be required for a blade to push snow to the side. In the brush embodiment of clearing mechanism 214, the brush may spin in either direction, but is generally operated so that snow is brushed away from robot 102.

Robot 102 may also include an optional treatment applicator 220 and associated treatment tank 222 that stores a treatment material 224 applied to path 180 by treatment applicator 220. In an embodiment, treatment material 224 is an ice-melter composition. In one embodiment, treatment applicator 220 is a spreader device and treatment material 224 is granular and spreadable by the spreader device. In another embodiment, treatment applicator 220 is a sprayer device and treatment material 224 is a liquid such as a de-icing solution. Treatment applicator 220 may be positioned aft of propulsion mechanism 212; for example, where treatment material 224 is a de-icing material, treatment applicator may deposit the de-icing material onto path 180 after robot 102 has removed snow therefrom.

In one embodiment, treatment applicator 220 is a vacuum device that collects and stores (e.g., in treatment tank 222) material as robot 102 moves. In this embodiment, clearing mechanism 214 is a brush that spins in an opposite direction (as compared to when used to remove snow) such that debris (e.g., dirt, leaves, etc.) may be loosened and collected by the vacuum device. Treatment applicator 220 may be selected and configured to collect debris from both hard (e.g., streets, pathways, pavement, etc.) and soft (e.g., grass) surfaces. For example, robot 102 may be configured to autonomously sweep debris from paths, walkways, streets, parking areas, and may also be used to clear leaves from lawns and other areas. For example, by implementing one or more known algorithms for traversing an area to clear it, path program 122 may be generated to control robot 102 to clear any area. Similarly, when configured with a lawn mowing unit, robot 102E may be provided with a path program 122 commanding it to traverse an area multiple times, the area being wider than the path it can clear in one pass, to mow the entire area.

Robot 102 also includes a controller 202 (e.g., an onboard computer) with a processor 204, memory 206, and an interface 240. Memory 206 may represent one or more of static RAM, dynamic RAM, non-volatile memory, FLASH memory, optical storage, magnetic storage, and so on. Interface 240 provides communication between controller 202 and external devices and may utilize one or more of Wi-Fi, Bluetooth, cellular, Ethernet, and USB type connections and connectors. Controller 202 communicates with a plurality of sensors 230, such as a camera, RADAR, LIDAR, infrared, ultrasonic sensor, an inertial platform, a GPS receiver (or other such navigation device), accelerometer, gyroscope, compass, proximity sensor, battery gauge, and/or fuel gauge. Using sensors 230, controller 202 determines a current status 270 of robot 102.

Controller 202 includes a control algorithm 208 that includes machine-readable instructions (i.e., software/firmware), stored within memory 206, that are executed by processor 204 to control operation of robot 102, in a particular embodiment these instructions are stored within a non-transitory computer readable media such as a flash memory device. Control algorithm 208 is shown with a control executive 250, an obstacle identifier 252, a navigator 254 and a monitor module 256. Control executive 250 provides high-level operational control of robot 102 and manages communication via interface 240 with ROC 120. Control executive 250 invokes other modules 252, 254, 256, as needed.

Control executive 250 invokes navigator 254 to process data from sensors 230 and determine a current location of robot 102 and a current direction of travel of robot 102. Navigator 254 directs robot 102 along path 180 as defined within path program 122. Navigator 254 processes data from sensors 230 to determine the current location, orientation, and speed of robot 102 and provides directives to adjust motion of robot 102 when robot 102 deviates from path 180 and/or path program 122.

Control executive 250 invokes obstacle identifier 252 to process data from sensors 230 to detect obstacles in or near the path of robot 102. If obstacles are near the path of robot 102, the robot 102 determines first if they correspond to obstacles having similar texture and location that were identified during path capture. If the obstacles match, such as is likely with walls, curbs, light poles, sign poles, fireplugs, railings, and similar immobile objects, the robot uses these obstacles to refine its location in the path it is following and avoids colliding with them in the same way the path capture device was manipulated to avoid them during path capture.

Obstacles other than those that match obstacles present during path capture may also be encountered; such obstacles may include one or more of people, cars, trucks, animals, mounds of snow from prior clearance efforts, and other movable objects. For example, data from one or more of sensors, that may include thermal and color cameras, RADAR, LIDAR, infrared and ultrasonic sensors, may be used to detect one or more of people, animals, and objects along path 180 of robot 102.

Sensors 230 may include pressure sensors, fluid level sensors, temperature sensors, voltage sensors, and current sensors that monitor the health of robot 102 by detecting one or more of engine fuel level, engine oil level, engine temperature level, battery level, operating temperature, and rotational speed of wheels and motors, and so on. Sensors 230 may also include sensors for detecting environmental data that may be sent back to ROC 120 such as one or more of ambient air temperature, relative humidity, atmospheric pressure, and so on.

In one example of operation, control executive 250 retrieves path program 122 from ROC 120 and invokes navigator 254 to determine, using one or more sensors 230, a current location of robot 102. Control executive 250 then invokes navigator 254 to control movement of robot 102 to follow path program 122. Control executive 250 and navigator 254 cooperate to follow path program 122 and clear snow from path 180 autonomously. For example, control executive 250 and navigator 254 cooperate to navigate robot 102 from its current location to a next location defined within path program 122 (e.g., utilizing a straight line (dead reckoning) path and navigational information determined by navigator 254). Robot 102 follows path program 122 until it reaches the end, wherein robot 102 may shut down until required again.

Within robot 102, control executive 250 invokes monitor module 256 to continually or periodically monitor sensors 230 to determine proximity of robot 102 to other objects. For example, monitor module 256 detects unexpected obstacles in the path of robot 102 by monitoring outputs from sensors 230. If an obstacle is detected, control executive 250 invokes obstacle identifier 252 to identify the unexpected obstacle based upon data from sensor 230. Obstacle identifier 252 may compare sensor data to object identity 282 of database 280 stored within memory 206. Database 280 may include a plurality of object identifiers 252 that each defines sensor data corresponding to a previously detected obstacle. Database 280 may also store actions 284 in association with one or more object identifier 252 that define directives to control robot 102 based upon the corresponding object identity 282. For example, object identity 282 may define sensor data corresponding to sensors 230 detecting a dog in front of robot 102, wherein corresponding actions 284 includes instructions to stop movement of robot 102, stop operation of clearing mechanism 214, and to wait until the obstacle clears. In another example, object identity 282 defines sensor data corresponding to detection of a snow drift in front of robot 102, wherein corresponding actions 284 include instructions to continue movement of robot 102 at a slower speed to clear the snow drift. In another example, object identity 282 defines sensor data corresponding to detection of certain objects, such as a trash can mistakenly left or blown onto path 180, and corresponding actions 284 include instructions for calculating movement of robot 102 around the trash can using sensors 230. For example, the directives 260 may define movements of robot 102 relative to the detected location and size of the unexpected obstacle. In another example, a vehicle is parked on or across path 180 such that robot 102 cannot be maneuvered around it, wherein actions 284 includes instructions to stop movement of robot 102, stop operation of clearing mechanism 214, and to wait for further instructions from ROC 120 and/or manual override control from a local human operator.

Control executive 250 periodically generates and sends status 270 to ROC 120. Control executive 250 may generate status 270 to include data from sensors 230 corresponding to the unexpected obstacle if detected. When an unexpected obstacle is detected but cannot be identified by obstacle identifier 252, control executive 250 stops movement of robot 102, generates status 270 to include sensor data from sensors 230 corresponding to the detected obstacle, sends status 270 to ROC 120, and then waits for further directives 260 from ROC 120 (or a local operator). For example, control executive 250 may utilize a camera of sensors 230 to capture an image of the unexpected obstacle and send that image to ROC 120 within status 270. Control executive 250 may stop motion of robot 102 until it receives further instructions from ROC 120. Robot controller 130 processes status 270 to generate one or more directives 260 that define actions for robot 102 to resolve the unexpected obstacle. For example, robot controller 130 may send directives 260 to robot 102 to (a) instruct robot 102 to wait until obstacle is no longer present and then resume following path program 122; (b) to instruct robot 102 to determine a path around the unexpected obstacle and continue following path program 122; or (c) instruct robot 102 to execute an action received from ROC 120.

Where the obstacle is to be avoided by robot 102, directives 260 may include instructions (e.g., a sub-program) for using sensor data to maneuver robot 102 around the obstacle while avoiding collision with the obstacle or any other object (e.g., a wall or edging of path 180). Control executive 250 may also learn and optimize such avoidance maneuvers based upon the determined identification and size of the obstacle.

Upon receiving directives 260 from ROC 120, control executive 250 may store directives 260 as actions 284 in association with sensor data corresponding to the unexpected obstacle as object identity 282 within database 280. Thus, in time, controller 202 learns how to identify and handle many different obstacles without waiting for directives 260 from ROC 120.

This learning approach utilizes obstacle identification and resolution within ROC 120 (e.g., where ROC 120 includes advanced analysis and resolution software, and/or a human operator determines identification and resolution). However, over time, controller 202 builds database 280 with intelligence to identify and handle unexpected obstacles autonomously. That is, robot 102 learns to take appropriate action to continue and complete the task defined within path program 122.

Control executive 250 sends (e.g., continuously and/or periodically—even when obstacles are not detected) time-stamped status 270 back to ROC 120 to allow robot controller 130 (or any supervisor with access to the data at ROC 120) to monitor the status and progress of robot 102. Communication between ROC 120 and robot 102 is secure.

Where ROC 120 generates directives 260 to resolve a situation, robot controller 130 may invoke document generator 370 to generate documentation 372 supporting a reason why a portion of path 180 has not been cleared. For example, service provider 151 may send such documentation to a customer requesting that the obstacle be removed from path 180 for future treatment operations by robot 102.

The Robot Operations Center (ROC)

Figure 8:
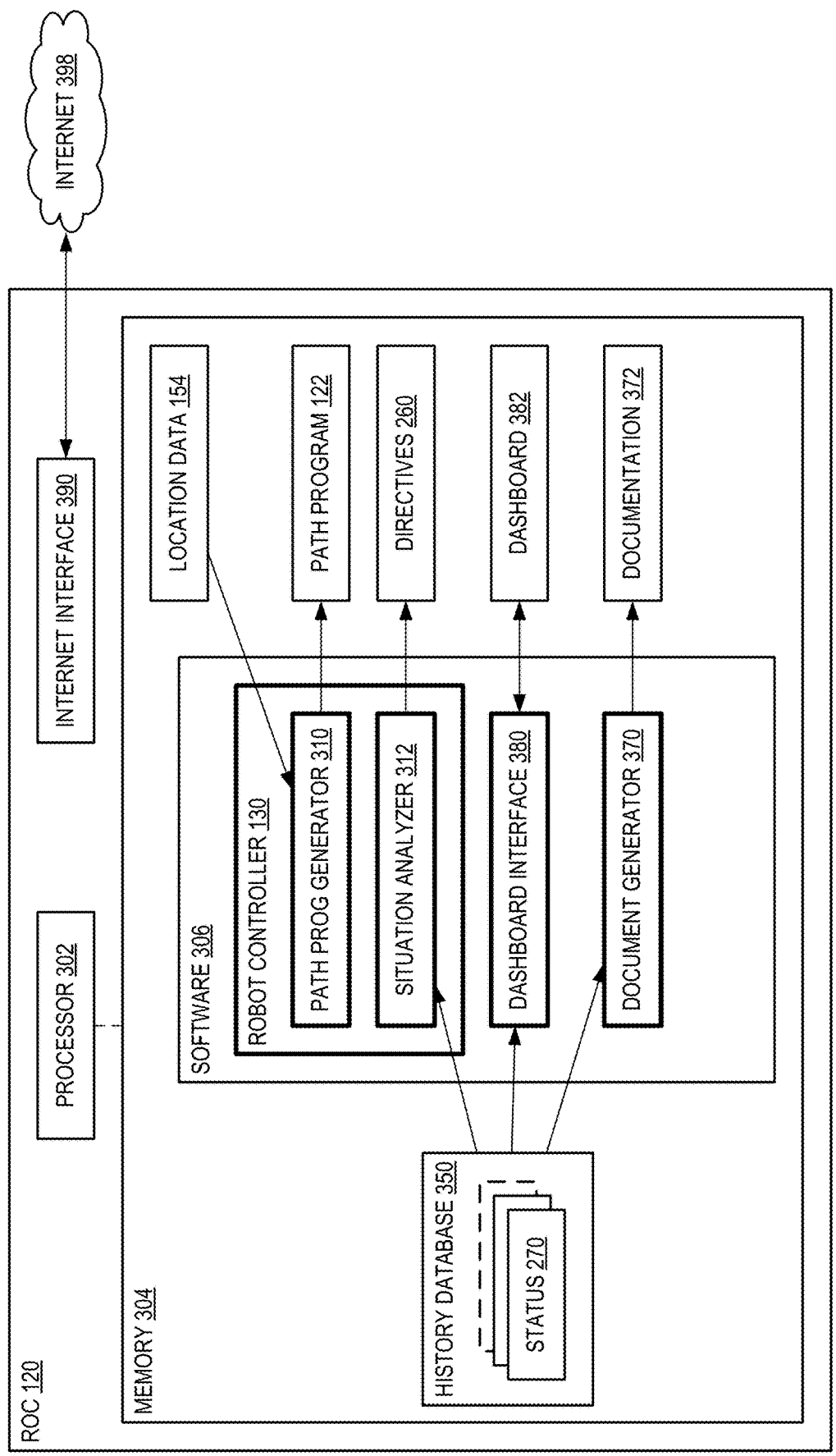
FIG. 8 shows the robot operation center of FIG. 1 in further exemplary detail.

FIG. 8 shows ROC 120 of FIG. 1 in further exemplary detail. ROC 120 includes a digital processor 302 or computer communicatively coupled with memory 304 and an Internet interface 390. Memory 304 represents one or both of volatile memory (e.g., RAM, DRAM, SRAM, and so on) and non-volatile or non-transitory memory such as FLASH, ROM, magnetic memory, magnetic disk, and other nonvolatile memory known in the computer art, and is illustratively shown storing software 306 implemented as machine readable instructions that are executed by processor 302 to provide the functionality of ROC 120 as described herein.

Software 306 includes robot controller 130 implemented with a path program generator 310 that generates path program 122 based upon location data 154, 192 received from path capture device 150 or from other sources such as a mapping, path, and area designation program 184. Path program 122 defines a series of coordinates and orientation vectors and other operational instructions, such as acceleration, speed, and the direction of discharge, for robot 102 to follow to clear path 180. Robot controller 130 also implements a situation analyzer 312 that processes status 270 received from robot 102 to determine progress of robot 102 through path program 122, and to resolve situations encountered by robot 102 that cannot be resolved by robot 102. For example, situation analyzer 312 may generate at least one directive 260 that is sent to robot 102 indicating one or more actions for robot 102 to take to resolve a current situation encountered by robot 102.

Software 306 also includes a dashboard generator 380 that generates a dashboard 382 (e.g., see FIG. 9 for additional detail) through cooperation with Internet interface 390 that allows an operator (or customer) to view progress of robot 102 clearing path 180. That is, dashboard generator 380 may process status 270 as it is received from robot 102 and update dashboard 382 in real-time. Dashboard generator 380 may also process previously recorded status 270 within history database 350 and generate a "replay" of activity by robot 102. For example, based upon recorded status 270 within history database 350, dashboard generator 380 may generate dashboard 382 to show progress of robot 102 on a previously completed clearing of path 180, thereby allowing an operator and/or customer to verify that path 180 was cleared correctly. Dashboard generator 380 may allow this replay at normal speed, and may allow speed of the replay to be increased and/or decreased through interaction with dashboard 382.

ROC 120 records status 270 within a history database 350 that provides evidence of the performance of robot 102. Software 306 also includes a document generator 370 that processes status 270 records within history database 350 to generate documentation 372, which may be sent to a customer as evidence that robot 102 has performed the necessary work (e.g., clearing snow from path 180) as a service to a third party. Documentation 372 contains information (e.g., dates, times, performance data, and images) that documents activity of robot 102. For example, documentation 372 may be automatically generated for each service (i.e., each path clearing) provided by robot 102, or may summarize activity over a predefined period (e.g., a weekly report).

Document generator 370 may digitally sign documentation 372 to ensure that it cannot be forged to show activities that did not occur, or to remove activities that did occur. That is, history database 350 and document generator 370 provide an accurate account of activity by robot 102.

In one embodiment, during operation, robot 102 (e.g., control executive 250) interacts with ROC 120 using one or more of cellular, satellite, and Wi-Fi protocols. Robot 102 may have its own IP address and thereby operates similarly to other Internet-of-Things (IoT) type devices. Although robot 102 may operate autonomously, without continuous communication with ROC 120, certain conditions may require robot 102 to communicate with ROC 120 or a local handheld computer (e.g., a smart phone) in order to clear the condition. For example, as described above, where control executive 250 and object identifier 252 cannot identify an unexpected obstacle, control executive 250 stops movement of robot 102 until further instructions are received. Primarily, these instructions (e.g., directives 260) will be received from ROC 120. Control executive 250 also attempts to communicate with a local operator's mobile device 190 if any is nearby and monitoring this robot. For example, control executive 250 may send a current status 270 to mobile device 190, which may be a smart phone or laptop computer running an app for communicating with robot 102, whereupon mobile device 190 alerts the local operator to the current condition of robot 102. The local operator may then interactively resolve the condition using mobile device 190, for example by remotely controlling robot 102 or shutting down robot 102 using mobile device 190, and/or may manually resolve the problem in other ways, for example by physically moving the obstacle.

ROC 120 may include one or more servers (e.g., computers, each with memory and at least one processor) that communicate with one another and with robot 102 as it operates to execute path program 122. ROC 120 may simultaneously communicate with a plurality of robots 102, controlling each one independently to complete different tasks, and convey status 270 of each robot 102 to one or more human operators. For example, an operator may connect to ROC 120 via a web browser over the Internet to monitor progress of the robots to complete their tasks. Each operator may be in charge of one or more robots 102. ROC 120 may thereby provide a cloud service (SaaS) that a customer uses to monitor operation of their robot(s) 102. For example, a customer may provide a snow clearing service to a third party using robots 102. In another example, a customer may use robots 102 to clear their own paths rather than employ a snow clearing service.

Figure 9:
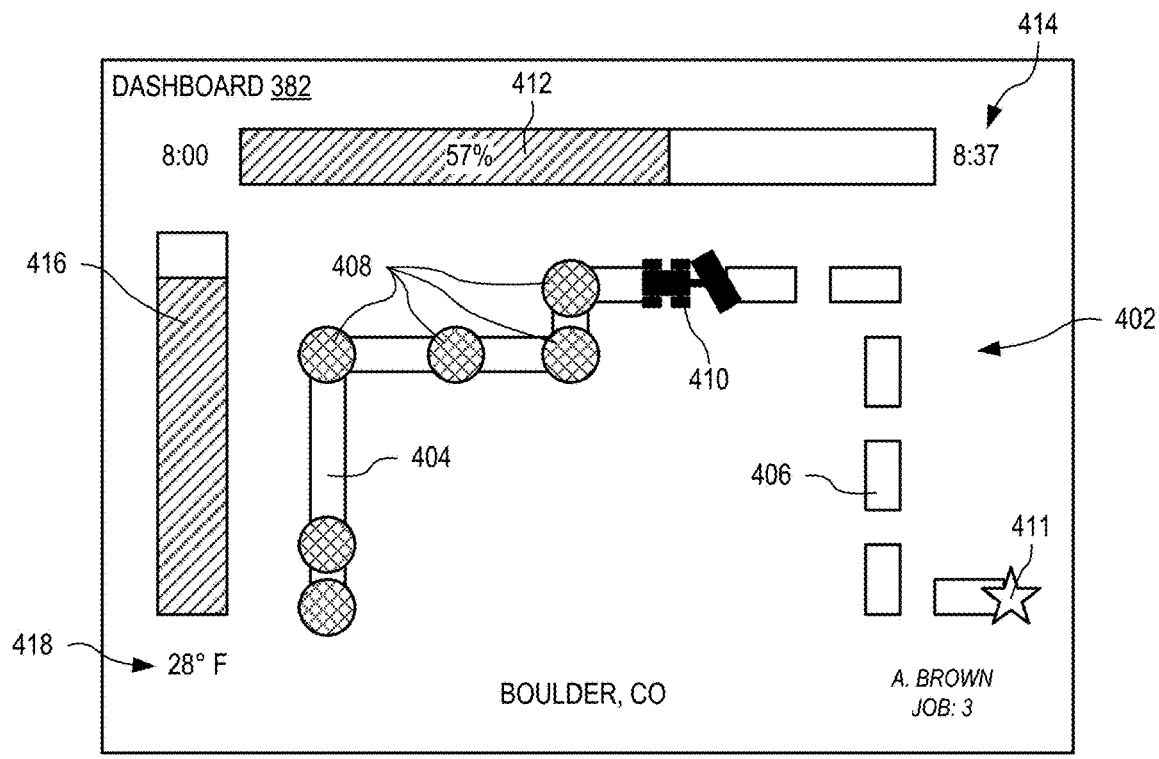
FIG. 9 shows one exemplary dashboard for displaying a current status and progress of the autonomous path treatment robot of FIG. 1, in an embodiment.

FIG. 9 shows one exemplary dashboard 382 for displaying a current status and progress of robot 102. Dashboard 382 is generated by dashboard generator 380 based upon status 270 received from robot 102 and may be viewed, via Internet interface 390, by an operator of service provider 151 and/or an operator of ROC 120. For example, the operator views dashboard 382 in a web page generated by ROC 120 to visually receive an indication of the status of each of one or more robots 102. Dashboard 382 is interactive and may allow the operator to drill-down into any given robot to receive more detailed information about the status of the robot, and of individual parts of the robot. Dashboard 382 may also allow the operator to control robot 102, for example to shutdown operation of robot 102, pause operation of robot 102, and so on.

As shown in FIG. 9, dashboard 382 includes a graphical representation 402 of path 180 where a first completed portion is represented as a solid line 404 and an untreated portion indicated as a dashed line 406. Graphical representation 402 may show key points 408 along path 180, a current location 410 of robot 102, and a finish location 411. A bar graph 412 may illustrate a progress of robot 102 along path 180 and an estimated time of completion 414. Dashboard 382 also shows a bar graph 416 representing one or more of: available fuel and/or battery level, available treatment material 224, and so on. Dashboard 382 may also show one or more images captured by sensors 230 and included within status 270.

Status 270 may include one or more images, captured by imaging sensors 230 of a view in any direction around robot 102. These images may be stored within memory 206 (e.g., within status 270) and within memory 304 of ROC 120, thereby providing a visual audit trail of activity by robot 102. For example, status 270 may be reviewed to determine whether robot 102 performed the required task (e.g., clearing path 180 at the requested time). In one embodiment, mobile device 190 may interrogate memory 206 of robot 102 to retrieve status 270 to determine and view the most recent actions of robot 102.

As noted above, all communication between robot 102 and ROC 120 is secure (e.g., encrypted and digitally signed) to protect against loss or corruption of sensitive data and to prevent robot 102 from being remotely "taken over" by a third party (e.g., hostile attacker/hacker). For example, all messages from ROC 120 to robot 102 are encoded for use only by the addressed robot 102. For example, each of ROC 120 and robot 102 may have its own set of public key infrastructure (PKI) keys thereby allowing secure communication.

The Path Capture Device

Figure 10:
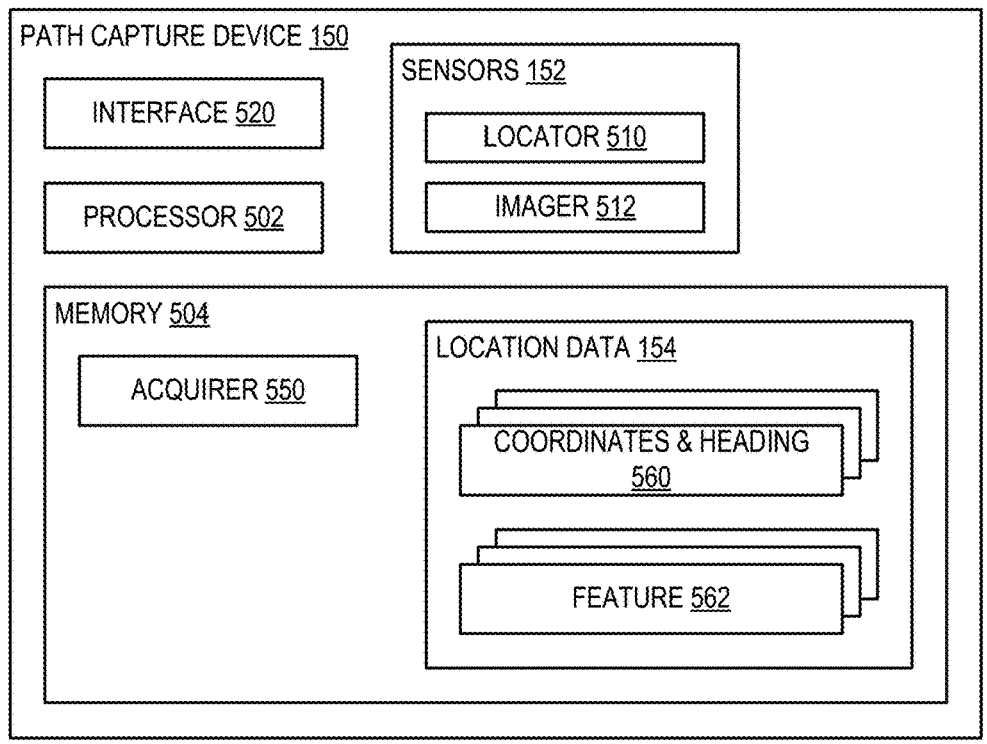
FIG. 10 shows the path capture device of FIG. 3 in further detail.

FIG. 10 shows path capture device 150 of FIG. 1 in further detail. As noted above, path capture device 150 collects and sends location data 154 to ROC 120. Path capture device 150 is a mobile computing device that includes a processor 502 communicatively coupled with a memory 504, a locator 510, and a communication interface 520. Memory 504 is shown storing an acquirer 550 that includes machine readable instructions executed by processor 502 to provide functionality of path capture device 150 as described herein. Locator 510 operates to determine a current location of device 150, and may represent a GPS receiver and/or a location triangulation receiver. Communication interface 520 implements one or more communication protocols such as Wi-Fi, cellular, Bluetooth, and so on, to allow path capture device 150 to communicate with ROC 120.

Path capture device 150 is taken to a site containing path 180 (which is to be cleared of snow for example) and moved (e.g., by an operator or customer) along path 180. The operator may simply walk path 180 while holding or pushing path capture device 150 operating in a "data-collection" mode. In data-collection mode, device 150 uses locator 510 to periodically, in an embodiment at least once per thirty centimeters, determine coordinates 560 of its current location and a current direction of travel that are then stored within memory 504. Device 150, or robot 102 operated in manual mode with path capture enabled, also automatically records any objects near the path and their texture detected at each point by sensors of the path capture device 150 or robot 102; these sensors include ultrasonic and LIDAR sensors adapted to scan at least ahead and to the sides of the path capture device 150 or robot 102. Path capture device 150 also allows the operator to record a feature 562 corresponding to coordinates 560 (i.e., capture a feature at a current location of path capture device 150) within location data 154. That is, path capture device 150 allows the user to mark significant features of path 180 while capturing coordinates 560. For example, the operator may identify a start location where robot 102 is to start treatment of path 180 and an end location identifying where robot 102 is to stop treatment of path 180. The operator may also indicate physical features of, or around, path 180 that may be useful when creating path program 122. For example, the operator may indicate the position of one or more of a curb, a step, a wall, a drop-off, a bank, and so on, relative to path 180. In one embodiment, the operator orients a camera of path capture device 150 towards a feature, and upon indication of the type of feature (e.g., wall, steps, etc.), path captures device 150 stores its current location, orientation (e.g., derived from sensors within path capture device 150 such as a magnetic compass, a GPS unit, and so on), and an image from the camera, corresponding to the identified feature, within memory 504.

When capturing coordinates 560 and features 562 of path 180, the operator may also interactively provide operational controls to path capture device 150. For example, where a wall is located along one side of path 180, the operator may interact with path capture device 150, at the appropriate location, to enter an operational control to change the direction of clearing mechanism 214 to clear snow to an opposite side of path 180 from the wall. Path capture device 150 may allow the operator to define other parameters relevant to robot 102, such as operation and application rate of treatment applicator 220 and a direction of rotation of clearing mechanism 214. Path capture device 150 may in some embodiments record video of the path, this video may be played back by an operator resolving issues with obstacles detected by robot 102 when robot 102 is treating the path.

During path capture, the robot 102 or path capture device 150 may, but need not, have the path clearance device 214 attached. In embodiments where path clearance device 214 is not present during capture, images captured with infrared and color cameras 150B are annotated with an outline of path clearance device 214 and displayed to an operator on screen 151A to assist in determining when movement of the robot should have adequately cleared the path. Similarly, in a particular embodiment a map showing zones expected to be cleared by prior movements of the robot is shown to the operator to assist the operator in moving the path capture device to capture a path that clears remaining portions of an area to be cleared without undue or insufficient overlap.

During collection, or once collection is completed, location data 154 is uploaded to ROC 120 and processed by path program generator 310 to generate path program 122.

Path capture device 150 may capture location data 154 for any number of paths at a given site and may capture location data 154 for any number of service locations. Where location data 154 is collected for multiple paths at a given site, path program generator 310 may generate sequence instructions within path program 122 to ensure that robot 102 (or multiple robots) working at that site clear path 180 in a most efficient sequence.

Path capture device 150 may also be used to define a perimeter of an area to be cleared, wherein path program generator 310 generates path program 122 with coordinates that control robot 102 to clear the defined area in a most effective manner. For example, when removing snow from a large area such as parking lot, one or more algorithms for traversing and clearing such areas may be used to generate path program 122 to move the snow in an efficient and effective manner such that the required effort by robot 102 is minimized.

In one embodiment, a drone is controlled to traverse path 180 collecting location data 154 and one or more of images, LIDAR data, and so on, that are used to identify features of the path.

In an alternative embodiment, generated path program 122 is overlaid on an aerial photograph or satellite photograph of the area to be treated and presented to an operator so that the operator can preview expected motions of the robot 102.

Securing Network Messages

Figure 11:
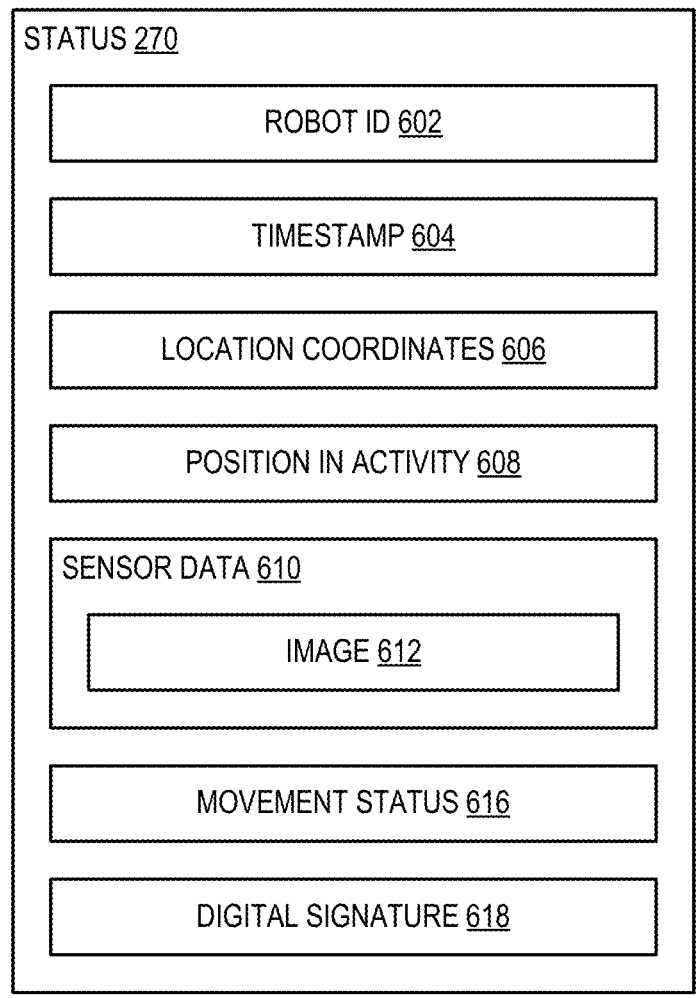
FIG. 11 shows the status of FIG. 5 in further exemplary detail.

FIG. 11 shows status 270 of FIG. 8 in further exemplary detail. Status 270 includes a robot ID 602, a time stamp 604, location coordinates 606, position in activity 608, sensor data 610, movement status 616, and a digital signature 618. Sensor data 610 may periodically include one or more images 612 (e.g., for audit purposes) and may include one or more images 612 acquired when an unexpected obstacle is detected by monitor module 256. In an embodiment, images 612 may be obtained in any desired direction around robot 102.

Robot ID 602 is an identifier that uniquely identifies robot 102, such as a unique serial number assigned to robot 102. Timestamp 604 defines the date and time that status 270 was generated by control executive 250, thereby allowing multiple status 270 records to be chronologically sorted to define an activity sequence. Location coordinates 606 define the location of robot 102 at the time status 270 was generated, and may for example be GPS coordinates. Position in activity 608 indicates progress of robot 102 through path program 122 and/or progress of robot 102 along path 180. Images 612 may be captured by one or more imaging sensors 230 of robot 102 at the time status 270 is generated and may show the portion of path 180 yet to be cleared and the portion of path 180 that has been cleared. In one embodiment, the one (or more) imaging sensor 230 is controllable to face any direction around robot 102. Sensor data 610 contains information from any of sensors 230 (e.g., LIDAR, proximity, environmental, etc.), sensed at the time status 270 is created. Movement status 616 includes an indication of current activity of robot 102, such as direction and speed of movement, tool activity and status, and so on. Each status 270 may include a digital signature 618 to ensure that communication from robot 102 to ROC 120 is secure, and cannot be spoofed or altered. ROC 120 may use digital signature 618 to ensure that status 270 was generated and sent by robot 102 and not by a malevolent third party.

In one embodiment, status 270 is generated at least once per minute, but normally more frequently. Where connectivity with ROC 120 is not available, status 270 may be stored within a non-volatile portion of memory 304 of controller 202 until communication with ROC 120 is available and status 270 is sent to ROC 120. In one embodiment, status 270 records are collected within memory 304 and collectively sent to ROC 120 at regular, but less frequent, intervals.

In one embodiment, communication between ROC 120 and robot 102 utilizes a sequence number to ensure that messages are not missed or duplicated. For each message received from robot 102, ROC 120 first validates the message (e.g., checking one or more of digital signature 618, a sequence number being next in sequence, and the message data is checked for integrity errors), then ROC 120 stores the message within history database 350 in association with robot 102 and optionally in association with service provider 151 and the third party or the address (site) being serviced, before it is stored persistently in history database 350 of ROC 120 (or an alternative "final audit database").

For example, each communication may involve first collecting the raw data together into a single "packet" along with the packet's monotonically increasing sequence number. Then a hash (message digest) of the packet is computed. This value (due to the properties of cryptographic hashes) is considered to be unique to the packet (like a fingerprint). Finally, the hash is digitally signed by robot 102 and sent to ROC 120.

As known in the art, a digital signature utilizes two encryption keys: a public key and a private key. In order to prevent spoofing of message and forgery, both encryption keys corresponding to robot 102 are generated by robot 102 and the private key is never transferred off of robot 102. For example, generation of encryption keys occurs as part of the initial configuration process when a customer first receives their robot 102. Once the encryption keys have been generated, robot 102 transmits the public key to ROC 102 where it is stored in association with robot 102. ROC 102 also has two encryption keys and transmits its public key to robot 102 and to service provider 151. Since the private key of robot 102 is not accessible by either ROC 102 or service provider 151, information within documentation 372 cannot be forged or altered since there is only one public key that matches the one private key on the robot. If the private key on robot 102 is changed or compromised, ROC 120 may detect this change because digital signature 618 could not be validated by the public key corresponding to robot 102.

Similarly, robot 102 may verify communications from ROC 120 using the public key of ROC 120, thus robot 102 may only be commanded from ROC 120, since robot 102 may detect when a command is not from ROC 120 since it cannot be decrypted by the ROC's public key, which was downloaded to robot 102 during configuration.

Document generator 370 may include a user interface to allow service provider 151 or the third party to request, in the event of a legal challenge, an audit trail from history database 350 for robot 102. In one embodiment, dashboard generator 380 generates a dashboard (e.g., dashboard 382 of FIG. 9) to replay status 270 records from history database 350 for robot 102, wherein service provider 151 and/or the third-party view dashboard 382 via Internet interface 390 to see a replay of activity by robot 102.

Digital signature 618 ensures that information within status 270 is not altered in any way after status 270 is generated by control executive 250, and may thereby be used to indicate that the data is authentic, and that the data has not been forged or altered by service provider 151 and/or ROC 120. Digital signature 618 thereby allows service provider 151 to provide that robot 102 performed the required treatment at the requested time and thus fulfilled a service contract. Further, because of digital signature 618, customers of service provider 151 are reassured that the evidence of service performed by robot 102 is true.

Figure 12:
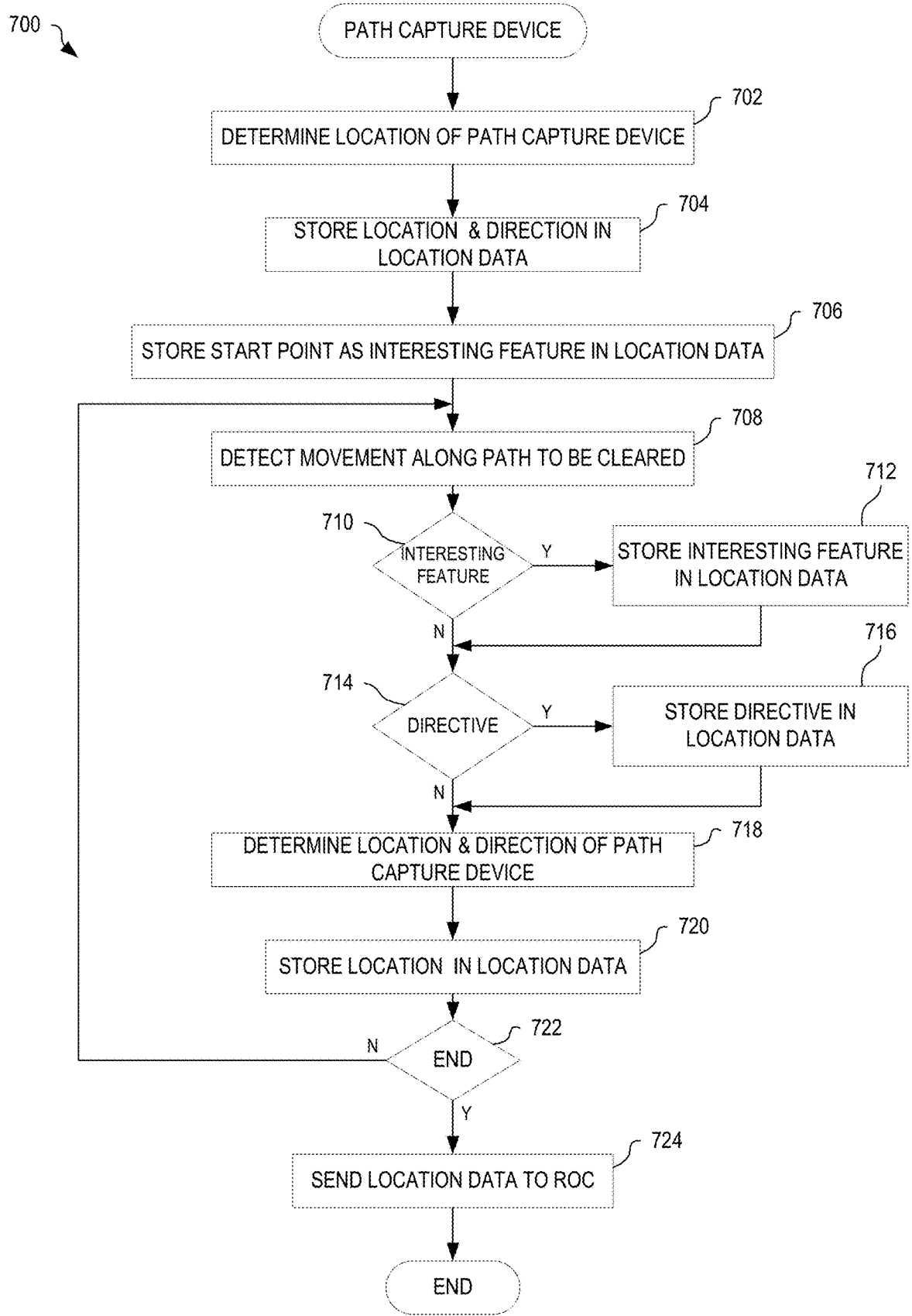
FIG. 12 is a flowchart illustrating one exemplar method for capturing location data defining a path to be treated by the autonomous path treatment robot of FIG. 1, in an embodiment.

FIG. 12 is a flowchart illustrating one exemplary method 700 for capturing location data 154 defining path 180 to be treated by robot 102. Method 700 is for example implemented within path capture device 150 of FIG. 1. Prior to invoking method 700 on path capture device 150, path capture device 150 is moved to a start point of path 180. That is, path capture device 150 is positioned at the point on path 180 where treatment by robot 102 is to commence.

In step 702, method 700 determines a location of the path capture device. In one example of step 702, path capture device 150 uses locator 510 to determine a current location of path capture device 150. In step 704, method 700 stores the determined location in location data. In one example of step 704, acquirer 550 stores coordinates 560 of the determined location of step 702 within location data 154. In step 706, method 700 stores start point as interesting features in location data. In one example of step 706, acquirer 550 stores feature 562 indicating start point within location data 154.

In step 708, method 700 detects movement along path to be cleared. In one example of step 708, acquirer 550 utilizes sensors 152 to detect movement of path capture device 150 before proceeding to step 710.

Step 710 is a decision. If in step 710, method 700 determines that an interesting feature has been located, method 700 continues with step 712; otherwise, method 700 continues with step 714. In one example of step 710, acquirer 550 determines that an interesting feature has been encountered based upon one or both of: receiving input from an operator of the path capture device 150 indicating a type of interesting feature encountered at a current location; and detecting an interesting feature using one or more sensors 152. For example, acquirer 550 may detect an interesting feature captured by imager 512 as path capture device 150 is moved along path 180. Interesting features may be selected from the group including: start point, end point, wall (left, right), curb (left, right), step (up, down), non-grass vegetation (left, right), permanent obstacle (unspecified, like a parked trailer, left, right), mailbox (left, right), drop-off (left, right), column (left, right), and so on.

In step 712, method 700 stores the interesting feature in location data. In one example of step 712, acquirer 550 stores feature 562 within location data 154. In step 712, acquirer 550 may store additional data from sensors 152 corresponding to the identified features within location data 154. Method 700 then continues with step 714.

Step 714 is a decision. If in step 714, method 700 determines that a directive is received, method 700 continues with step 716; otherwise, method 700 continues with step 718. In one example of step 714, a user enters a directive to path capture device 150 indicating a direction for cleared snow.

In step 716, method 700 stores the directive in location data. In one example of step 716, acquirer 550 stores directive within feature 562 of location data 154. For example, the user may indicate that snow is to be cleared to the left, wherein the directive stored within feature 562 may indicate an angle of minus thirty degrees for clearing mechanism 214, thus defining the clearing direction for snow until changed by the user. In one example of operation, as the user and path capture device 150 are positioned at the start of path 180, the user is prompted for an initial clearing direction. Steps 714 and 716 allow other directives (e.g., clearing mechanism 214 brush on/off and spin direction, treatment applicator 220 activation/deactivation, and so on) to be entered and stored within location data 154.

In step 718, method 700 determines a location of the path capture device. In one example of step 718, acquirer 550 uses locator 510 to determine a current location of path capture device 150. In step 720, method 700 stores the determined location in location data. In one example of step 720, acquirer 550 stores coordinates 560 of the determined location of step 718 within location data 154. Where a feature 562 has been added to location data 154, coordinates 560 and feature 562 may be stored in association with one another within location data 154. Optionally, in step 718, method 700 may also determine an orientation of path capture device 150 as indicating a direction of an interesting feature or as a direction for an entered directive, wherein the determined orientation is stored in location data 154 in association with the entered feature or directive.

Step 722 is a decision. If, in step 722, method 700 determines that an end of a portion of path 180 to be treated by robot 102 has been reached, method 700 continues with step 724; otherwise method 700 continues with step 708. That is, steps 708 through 722 repeat as path capture device 150 is moved along path 180 over the area to be treated by robot 102. When the end of the area to be treated is reached, the operator of path capture device 150 may provide an input to indicate the end, wherein method 700 continues with step 724.

In step 724, method 700 sends the location data to the ROC. In one example of step 724, acquirer 550 sends location data 154 to ROC 120 via interface 520.

Figure 13:
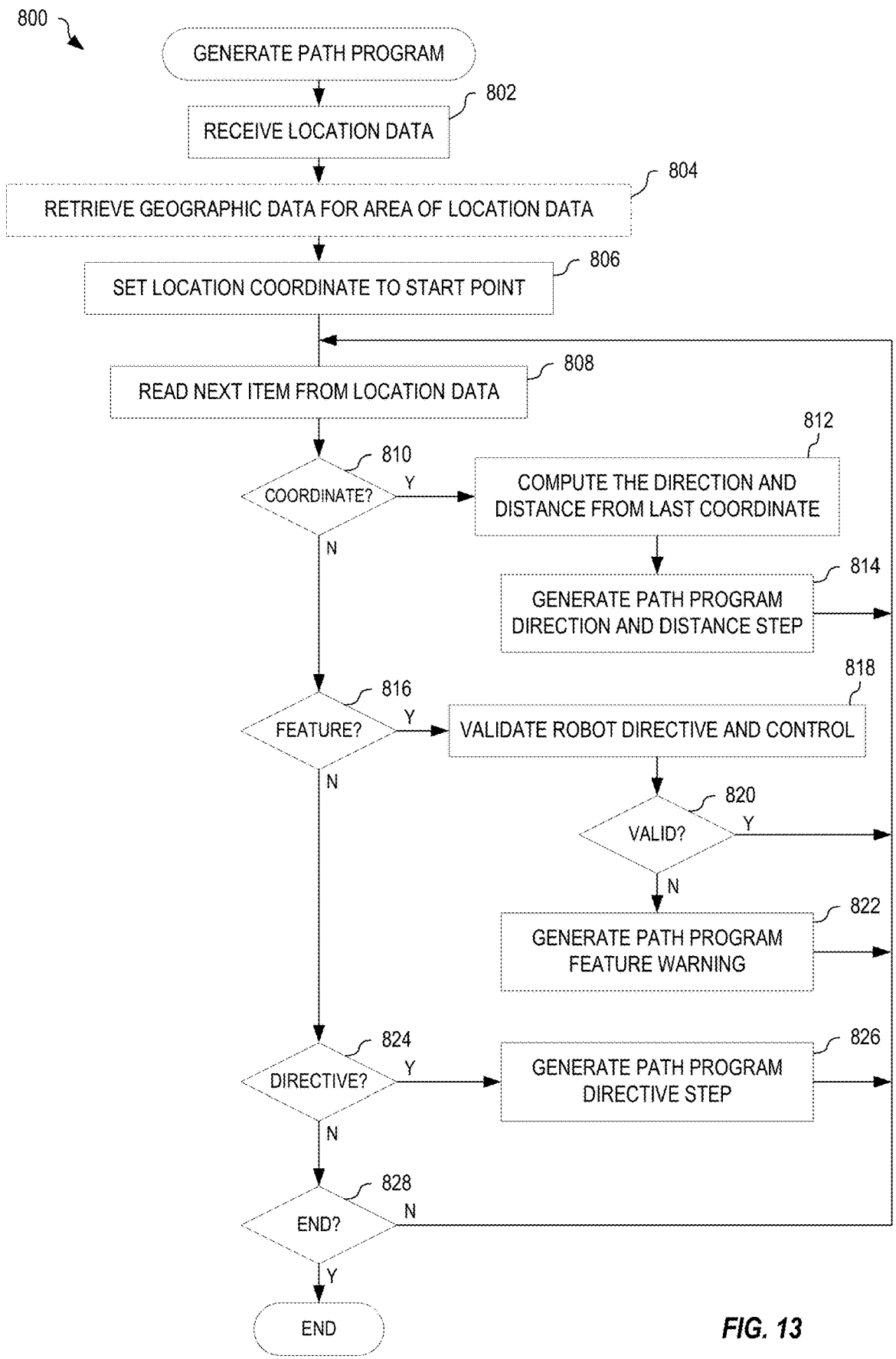
FIG. 13 is a flowchart illustrating one exemplary method for generating the path program of FIG. 1, in an embodiment.

FIG. 13 is a flowchart illustrating one exemplary method 800 for generating the path program. Method 800 is implemented by path program generator 310 of ROC 120 for example.

In step 802, method 800 receives location data. In one example of step 802, ROC 120 receives location data 154 from path capture device 150.

Step 804 is optional. If included, in step 804, method 800 retrieves geographic data for the area covered by the location data. In one example of step 804, path program generator 310 retrieves, for an area corresponding to the area covered by location data 154, one or more of satellite imagery, topographic data, building plans, and so on.

In step 806, method 800 sets the location coordinate to a start point. In one example of step 806, a last coordinate variable storing a previous location coordinate in the generated program is initialized to the start location. In step 808, method 800 reads a next item from location data. In one example of step 808, path program generator 310 reads a next item from location data 154 received in step 802.

Step 810 is a decision. If, in step 810, method 800 determines that the item read in step 808 contains coordinates, method 800 continues with step 812; otherwise, method 800 continues with step 816. In step 812, method 800 computes the direction and distance from the last coordinate to the next coordinate from the last coordinate. In one example of step 812, path program generator 310 computes a heading and a distance between the last coordinate and the next coordinate read in step 808. For example, path program generator 310 may determine that robot 102 should move two feet in a due west direction. In step 814, method 800 generates path program travel vector steps including a turn heading and an acceleration value. In one example of step 814, path program generator 310 generates a step in path program 122 with instructions to move robot 102 two feet in a due west direction by turning −90 degrees from a current heading of due north and accelerating to 1 mph. Method 800 continues with step 808.

Step 816 is a decision. If, in step 816, method 800 determines that the item read in step 808 contains feature, method 800 continues with step 818; otherwise, method 800 continues with step 824. In step 818, method 800 validates the current robot directives and controls in view of the identified feature and its location relative to the programmed location of robot 102 when moving along path 180 to ensure that the robot 102 can physically follow the path 180 while avoiding obstacles identified during path capture and while directing snow or debris away from tall obstacles such as walls. For example, robot 102 has limitations on turn radius; validation includes verifying that the robot 102 can turn sharply enough to follow turns of path 180 without colliding with obstacles. Further, since robot 102 has non-zero length, validation includes verifying that all parts of robot 102 remain clear of obstacles while performing turns required while following path 180. In one example of step 818, where the identified feature read in step 808 is a wall on the left side of path 180, path program generator 310 validates, based upon previously defined directives and movement stored within path program 122, that the direction of snow clearance by clearing mechanism 214 is not towards the wall (i.e., not to the left). In another example of step 818, when the feature read in step 808 indicates a curb on a right side of path 180, path program generator 310 validates that a programmed speed of robot 102 within path program 122 is reduced. That is, based upon the feature read in step 808, method 800 may modify path program 122 to control robot 102 to move at a slower speed when near the feature. In another example, based upon the feature read in step 808, method 800 may modify path program 122 to control robot 102 to monitor data from sensor 230 more frequently to prevent collision with the feature. In another example of step 818, when the feature read in step 808 indicates a step in path 180 that robot 102 should traverse, path program generator 310 validates that the speed of robot 102 programmed within path program 122 is correct for traversing the step, and, if programmed speed is incorrect for traversing the step may adjust the programmed speed of the robot for that step. In particular, when in the vicinity of physical features or obstacles identified during path generation, path program generator 310 may adjust programmed speed of the robot to ensure the robot can navigate the path without marring or colliding with those physical features or obstacles. In certain embodiments, in step 818, method 800 may generate one or more additional directives and movement commands within path program 122 to enable robot 102 to negotiate the feature.

Step 820 is a decision. If, in step 820, method 800 determines that the robot directives and controls are valid, method continues with step 808; otherwise method 800 continues with step 822. In step 822, method 800 generates a path program feature warning. Optionally, step 822 may also generate one or more additional steps within path program 122 to correct operation of robot 102 in view of the invalid robot directives and controls. Method 800 then continues with step 808.

Step 824 is a decision. If, in step 824, method 800 determines that the item read in step 808 contains directive, method 800 continues with step 826; otherwise, method 800 continues with step 828. In step 826, method 800 generates a path program directive step. In one example of step 826, when the directive read in step 808 indicates that the clearing mechanism 214 is to be activated, path program generator 310 generates a program step within path program 122 to activate clearing mechanism 214. In another example of step 826, when the directive read in step 808 indicates that the clearing direction for clearing mechanism 214 should be to the right, path program generator 310 generates a step within path program 122 to move clearing mechanism 214 such that snow is cleared to the right. Method 800 then continues with step 808.

Step 828 is a decision. If, in step 828, method 800 determines that an end of location data 154 has been reached, path program 122 is complete and method 800 terminates; otherwise, method 800 continues with step 808. Steps 808 through 828 thus repeat to process all data within location data 154. Path program 122 is stored within ROC 120 until requested by control executive 250 when robot 102 is about to operate.

As noted above, ROC 120 may apply encryption and digital signatures to path program 122 to ensure security of robot 102 control.

Figure 14:
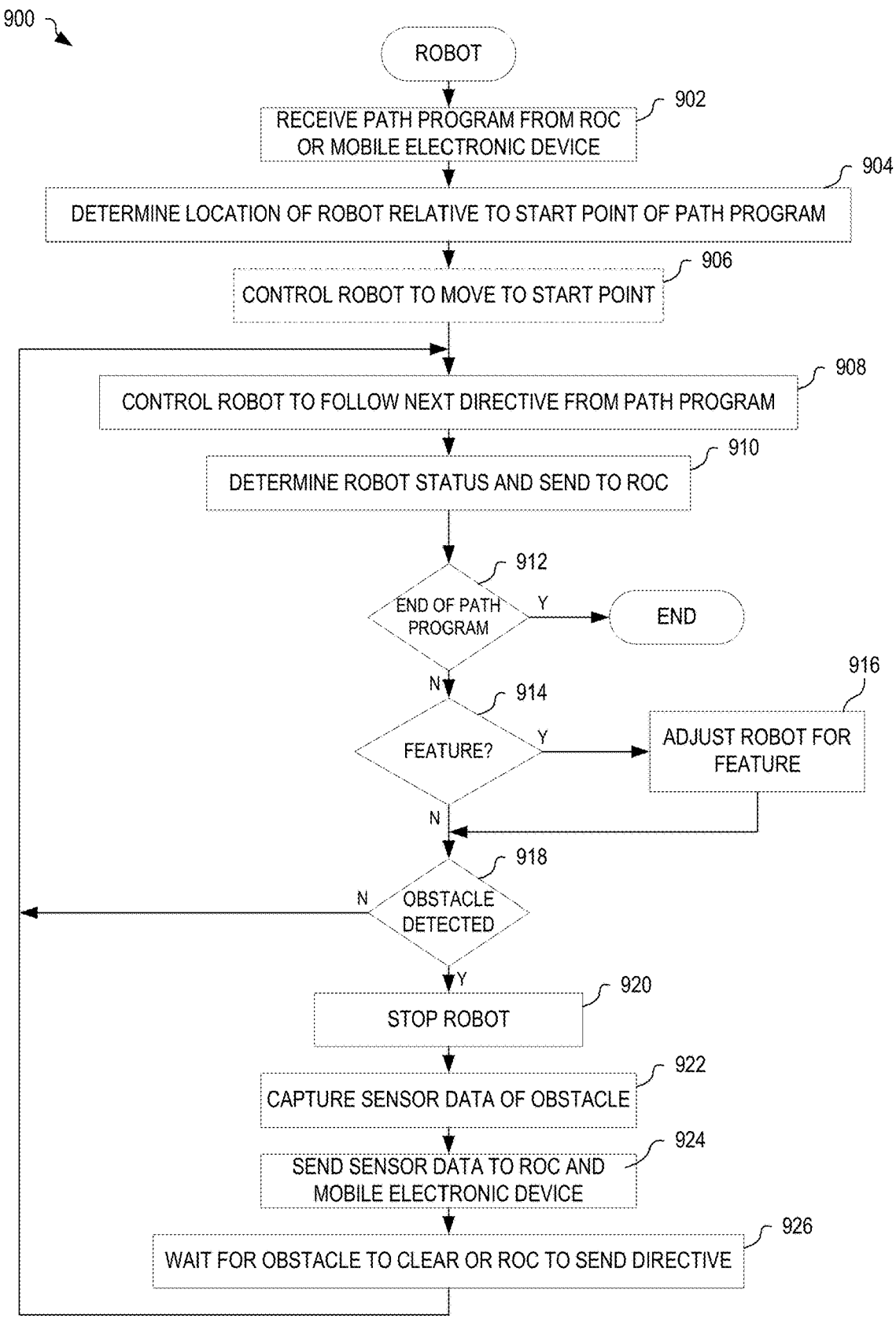
FIG. 14 is a flowchart illustrating one exemplary method for autonomous path treatment, in an embodiment.

FIG. 14 is a flowchart illustrating one exemplary method 900 for autonomous path treatment. Method 900 is implemented by control algorithm 208 of robot 102 for example.

In step 902, method 900 receives the path program from the ROC or from a mobile electronic device such as a smartphone or laptop computer. In one example of step 902, control algorithm 208 received path program 122 from ROC 120.

In step 904, method 900 determines the location of the robot relative to the start point of the path program. In one example of step 904, control algorithm 208 utilizes sensors 230 to determine a location and orientation of robot 102, and then determines its position relative to a start location of path program 122.

Step 906 is optional. If included, in step 906, method 900 controls the robot to move to the start point. Where step 906 is not included, robot 102 may be controlled manually (e.g., by an operator using a mobile device communicatively coupled with robot 102) to be positioned at a start point. For example, an operator may use an enabled smart phone running an appropriate app or a laptop computer to communicate with and control robot 102 to move to the start point. Through interaction with robot 102 and an indicated start point within path program 122, the app may indicate when robot 102 is at the start point. In one example of step 906, control algorithm 208 invokes navigator 254 to control robot 102 to move from its current location to a location at the start of path program 122.

In step 908, method 900 controls the robot to follow a next directive from the path program. In one example of step 908, control algorithm 208 reads a next directive from path program 122 and controls robot 102 to follow the directive.

In step 910, method 900 determines a status of the robot and sends the status to the ROC. In one example of step 910, control algorithm 208 determines status 270 of robot 102 and sends status 270 to ROC 120.

Step 912 is a decision. If, in step 912, method 900 determines that the end of the path program has been reached, method 900 terminates; otherwise, method 900 continues with step 914.

Step 914 is a decision. If, in step 914, method 900 determines that the robot is at a feature of interest, method 900 continues with step 916; otherwise, method 900 continues with step 918. In one example of step 914, control algorithm determines that a current location of robot 102 has an associated feature of interest within path program 122 and continues with step 916.

In step 916, method 900 adjusts the robot for the feature of interest. In one example of step 916, control algorithm 208 applies one or more directives from path program 122 corresponding to the feature of interest and monitors the feature of interest using one or more sensors 230. Where necessary, control algorithm 208 generates additional directives 260 based upon sensors data from sensors 230 based upon the detected features and a current position and orientation of robot 102.

Step 918 is a decision. If, in step 918, method 900 determines that an obstacle is detected, method 900 continues with step 920; otherwise, method 900 continues with step 908. Steps 908 through 918 thereby repeat provided no unexpected obstacle is encountered by robot 102.

In step 920, method 900 stops the robot. In one example of step 920, control algorithm 208 stops propulsion mechanism 212, stops clearing mechanism 214, and stops treatment applicator 220.

In step 922, method 900 captures sensor data of obstacle. In one example of step 922, control algorithm 208 captures sensor data from sensor 230 of the unexpected obstacle. In step 924, method 900 sends the sensor data to the ROC and, if it is being controlled locally, also to a mobile electronic device such as a smartphone or laptop computer. In one example of step 924, control algorithm 208 sends sensor data from sensors 230 corresponding to the detected obstacle to ROC 120. In step 926, method 900 waits for the obstacle to clear, or for either the ROC or a mobile electronic device such as a smartphone or laptop computer to send directives. In one example of step 926, control algorithm 208 utilizes sensors 230 to determine when a mobile unexpected obstacle, such as a dog, cat, car, golf cart, or a person, has cleared from path 180, or waits for additional directives 260 from ROC 120 or mobile electronic device that instruct robot 102 and that may be executed prior to executing a next directive from path program 122. For example, ROC 120 may send directives 260 to maneuver robot 102 around or over the unexpected obstacle. For example, ROC 120 may control robot 102 to capture and send LIDAR data of the area around and including the obstacle to ROC 120. ROC 120 may then generate a three-dimensional model of the object and surrounding area, and generate directives to maneuver robot 102 around the obstacle based upon the three-dimensional model.

ROC 120 may also determine and send a directive to set a resume position within path program 122 such that robot 102 continues with the appropriate command after maneuvering robot 102 to avoid the obstacle. For example, based upon a determined location of robot 102 after being maneuvered around the obstacle, one or more steps of path program 122 may be skipped and operation of components of robot 102 may be resumed. Method 900 then continues with step 908.

Figure 15:
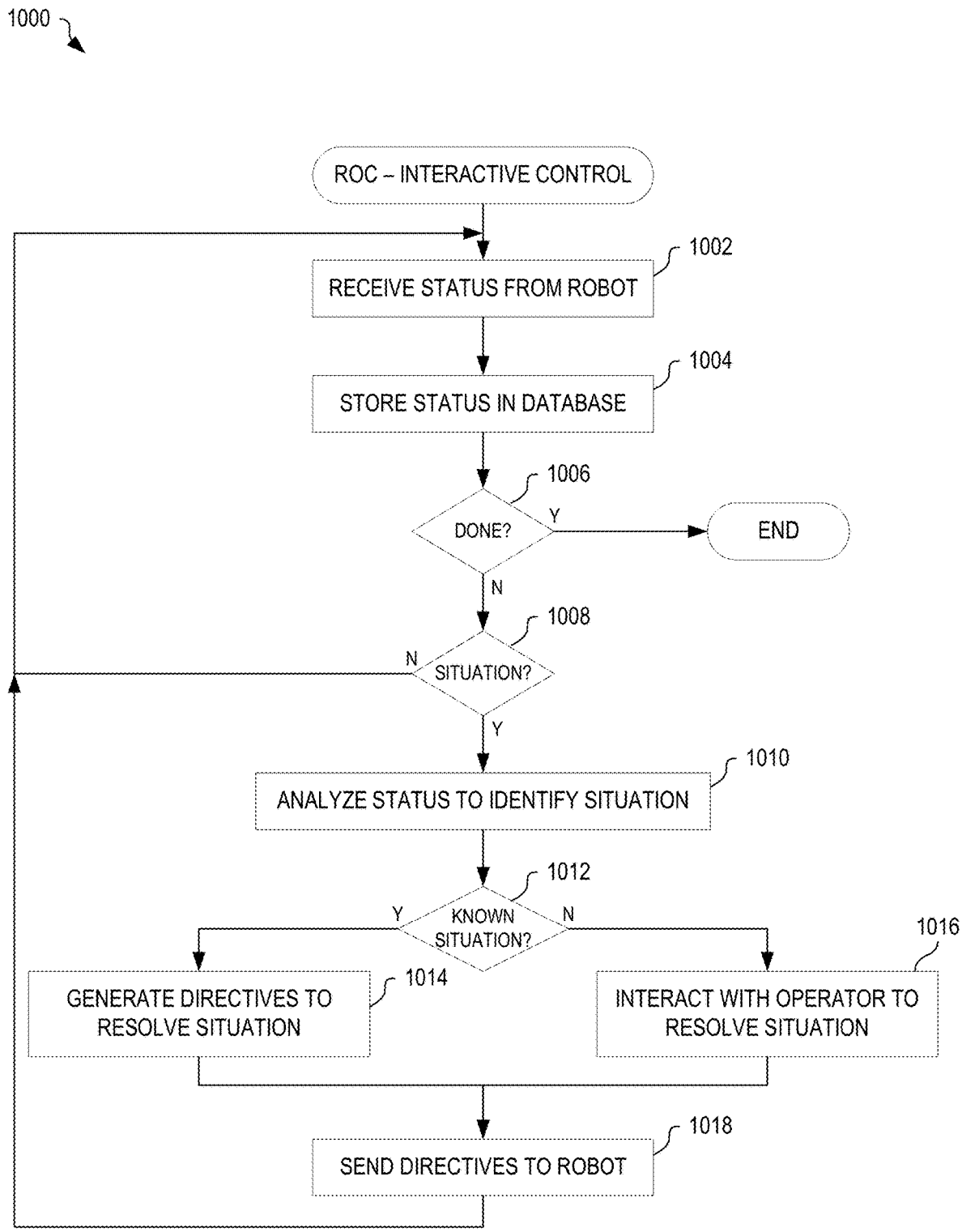
FIG. 15 shows one exemplary method for providing interactive control of the autonomous path treatment robot of FIG. 1, in an embodiment.

FIG. 15 shows one exemplary method 1000 for providing interactive control of robot 102 of FIG. 1. Method 1000 is implemented within situation analyzer 312 of ROC 120 for example.

In step 1002, method 1000 receives a status from the robot. In one example of step 1002, situation analyzer 312 receives status 270 from robot 102.

In step 1004, method 1000 stores the status within a database. In one example of step 1004, situation analyzer 312 stores status 270 within history database 350.

Step 1006 is a decision. If, in step 1006, method 1000 determines that robot has completed the path program, method 1000 terminates; otherwise, method 1000 continues with step 1008.

Step 1008 is a decision. If, in step 1008, method 1000 determines that an unexpected situation has occurred with the robot, method 1000 continues with step 1010; otherwise, method 1000 continues with step 1002. Steps 1002 through 1008 repeat until the robot finishes the path program or encounters an unusual situation (e.g., an unexpected obstacle).

In step 1010, method 1000 analyzes the status to identify the situation. In one example of step 1010, situation analyzer 312 processes and matches sensor data within status 270 against previously encountered situations to identify the unexpected situation.

Step 1012 is a decision. If, in step 1012, method 1000 determines that the robot has encountered a known situation, method 1000 continues with step 1014; otherwise, method 1000 continues with step 1016.

In step 1014, method 1000 generates directives for the robot to resolve the situation. In one example of step 1014, situation analyzer 312 generates one or more directives 260 to control robot 102 to resolve the current situation based upon previous success in resolving similar situations. For example, ROC 120 learns from previous handling of a similar situation and may thereby generate directives 260 for resolving the current situation based upon success of these previously issued directives. Method 1000 then continues with step 1018.

In step 1016, method 1000 interacts with an operator to determine directives 260 for resolving the current situation. In one example of step 1016, situation analyzer 312 interacts with an operator to determine one or more directives 260 for robot 102 to resolve the current situation. For example, the operator may review status 270 and thus sensor data corresponding to an unexpected obstacle, and then enter one or more directives 260 that instruct robot 102 to move around the obstacle. Method 1000 then continues with step 1018.

In a particular embodiment, sensor data from cameras is annotated with symbols indicating an effective reach of the path treatment device 214.

In step 1018, method 1000 sends the determined directives to the robot. In one example of step 1018, situation analyzer 312 sends directives 260 to robot 102.

Steps 1002 through 1018 thereby repeat to handle any unexpected obstacle or unexpected situation with robot 102.

Figure 16:
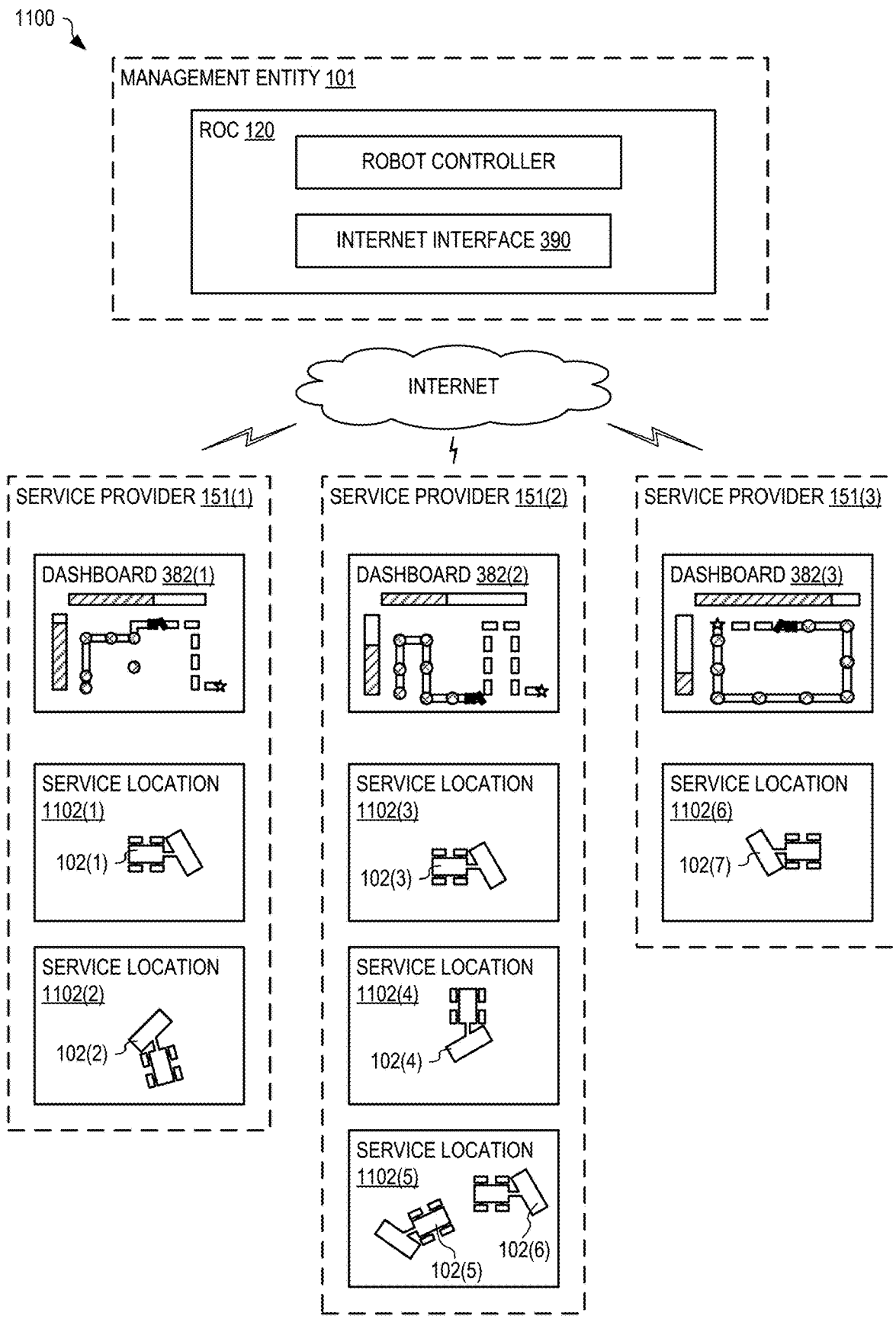
FIG. 16 shows one exemplary scenario where a management entity operates the robot operations center of FIG. 1 to provide simultaneous service to three service providers that each utilize one or more of autonomous path treatment robots, in an embodiment.

FIG. 16 shows one exemplary scenario 1100 where management entity 101 operates ROC 120 to provide simultaneous service to three service providers 151(1)-(3), where each service provider 151 utilizes one or more robots 102. That is, ROC 120 simultaneously controls many robots 102 to clear paths at different locations. Specifically, ROC 120 maintains separate path programs 122 for each robot 102 based upon captured location data 154 for the paths indicated for treatment by that robot. Further, service provider 151 may utilize more than one robot 102 at a particular service location 1102, particularly where the path to be cleared is large. In the example of FIG. 16, service provider 151(1) has two robots 102(1) and 102(2) that operate at service locations 1102(1) and 1102(2), respectively; service provider 151(2) has two robots 102(3) and 102(4) that operate at service locations 1102(3) and 1102(4), respectively, and two robots 102(5) and 102(6) that operate at service location 1102(5); and service provider 151(3) has one robot 102(7) that operates at service location 1102(6).

Service provider 151(1) views a dashboard 382(1) at a single location/console corresponding to operation of each robot 102(1) and 102(2). Similarly, service provider 151(2) views a dashboard 382(2) at a single location/console corresponding to operation of each of robots 102(3)-(6), and service provider 151(3) views a dashboard 382(3) at a single location/console corresponding to operation of robot 102(7). That is, ROC 120 simultaneously provides control and monitoring of a plurality of robots 102 at different service locations 1102 and under control of various service providers 151. ROC 120 also provides documentation 372 indicative of services performed by each robot 102, thereby allowing each service provider 151 to provide evidence of services provided to each service location 1102.

Figure 17:
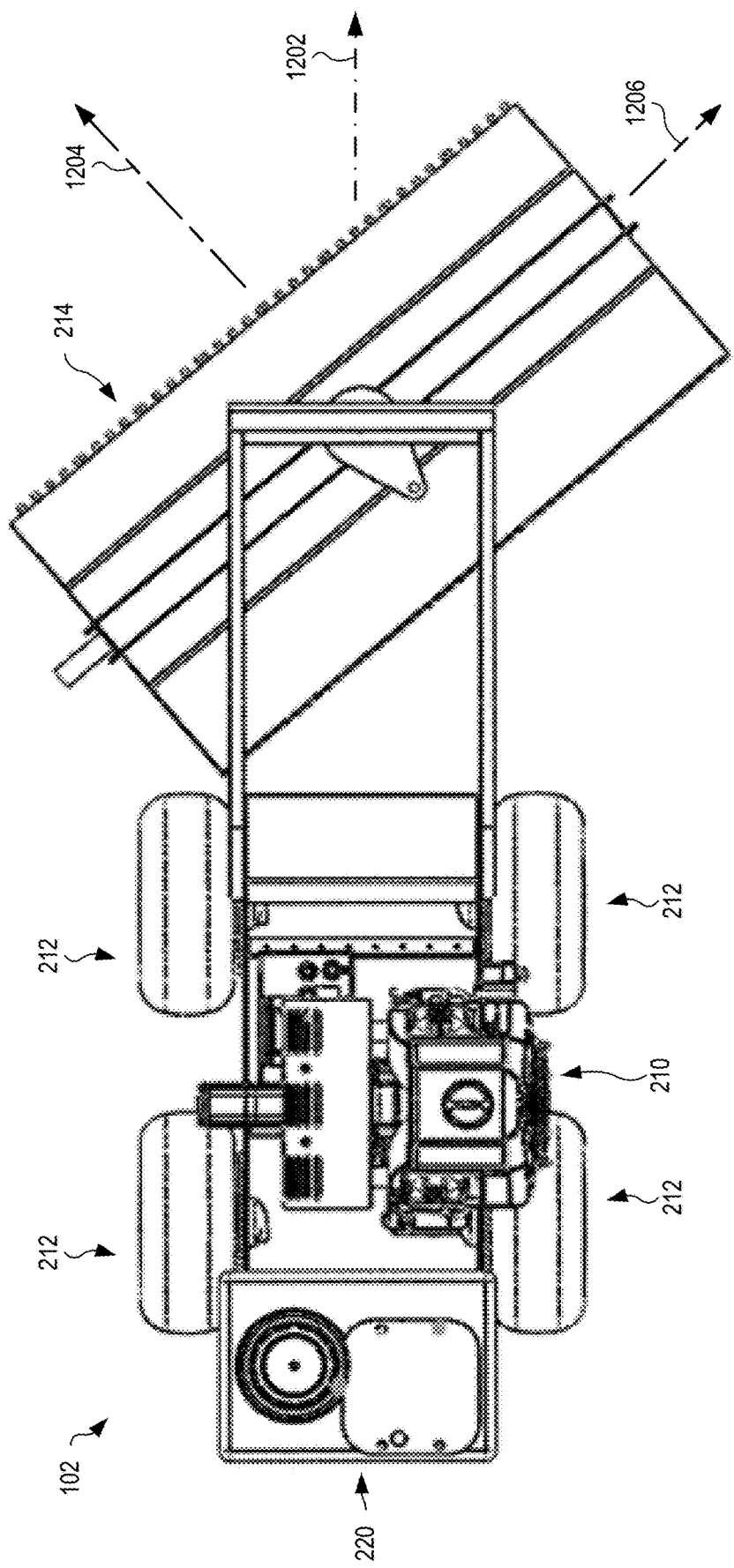
FIG. 17 is a schematic illustrating a plan view of the robot of FIG. 1 in an embodiment.

FIG. 17 is a schematic illustrating a plan view of robot 102 in one exemplary embodiment. In the embodiment, of FIG. 17 power source 210 is an internal combustion engine and an alternator for generating electrical power. Propulsion mechanism 212 includes four wheels with snow tires that drive robot 102 forwards in a direction indicated by arrow 1202. Propulsion mechanism 212 may also be controlled to turn robot 102. Clearing mechanism 214 is a rotating brush, driven by power from power source 210. Clearing mechanism 214 is turned, relative to the propulsion direction indicated by arrow 1202, such that cleared snow is thrown to the left, as indicated by arrow 1204. The clearing direction of clearing mechanism 214 is controllable (e.g., using path program 122) to clear snow to the right of robot 102 as indicated by arrow 1206. For example, based upon topography of path 180 and its surrounding, clearing direction of clearing mechanism 214 may be adjusted such that snow is cleared efficiently.

Combinations of Features

The features and method steps herein described may be present in embodiments in many combinations. Among those combinations are:

A method designated A for autonomously treating a path, including receiving, within a computer server, coordinates defining the path; generating, based upon the coordinates, a path program for controlling an autonomous path treatment robot to autonomously treat the path; and sending the path program to control the autonomous path treatment robot to treat the path. The server or a handheld device may receive status information from the autonomous path treatment robot during treatment of the path; and the server generates documentation indicative of the path treatment by the autonomous path treatment robot based upon the status information.

A method designated AA including the method designated A, further including determining, from the status information, when the autonomous path treatment robot has encountered an unexpected obstacle; analyzing sensor data within the status information to identify the unexpected obstacle; generating one or more directives, based upon the identity or type of the unexpected obstacle, to control the autonomous path treatment robot to negotiate the unexpected obstacle; and sending the directives to the autonomous path treatment robot.

A method designated AB including the method designated A or AA further including receiving, in association with at least one of the coordinates received from the mobile device, a feature indicator indicative of a physical feature of, or around, the path; and the step of generating the path program further includes validating the path program to ensure that the robot is capable of following the path.

A method designated AC including the method designated A, AA, or AB further including the step of validating further comprising modifying the path program to adjust a speed of the autonomous path treatment robot when proximate the physical feature.

A method designated ACA including the method designated AC, the step of validating further comprising generating a warning when the robot cannot follow the path because of turn radius and length of the autonomous path treatment robot.

An autonomous path treatment system designated B, includes a source of coordinates and directions of travel corresponding to a path to be treated which in some embodiments is computer executing mapping and path designation software using an aerial photograph, and in other embodiments is a mobile path recording device having a locator, a processor and a memory storing machine readable instructions executable by the processor to capture, using the locator, a sequence of coordinates and directions of travel of the path to be treated as the mobile device is moved along the path by an operator; The system also includes an autonomous path treatment robot having: a motor for maneuvering the robot along the path; a treatment mechanism for treating the path; and a controller having a processor and memory storing machine readable instructions that when executed by the processor obeys steps of a path program to control the motor and the treatment mechanism to treat the path; and a server configured to generate the path program from recorded sequence of coordinates and instructions, the path program comprising instructions for controlling the autonomous path treatment robot to treat the path based upon the coordinates. The server is configured to: send the path program to the autonomous path treatment robot; receive the status information from the autonomous path treatment robot via the wireless interface as the autonomous path treatment robot treats the path; and generate a dashboard illustrating a status of the autonomous path treatment robot based upon the status information.

An autonomous path treatment system designated BA including the system designated B, wherein the server further includes a processor and a memory storing machine readable instructions executable by the processor to: receive the coordinates of the path from the mobile device; determine, from the status information, when the autonomous path treatment robot has encountered an unexpected obstacle; analyze sensor data within the status information to identify the unexpected obstacle; generate one or more directives, based upon the identified unexpected obstacle, to control the autonomous path treatment robot to negotiate the unexpected obstacle; and send the directives to the autonomous path treatment robot via the wireless interface. In particular embodiments, the memory storing machine readable instructions is non-transitory.

An autonomous path treatment system designated BB including the system designated B or BA, the memory of the mobile device further storing machine readable instructions executable by the processor to capture one or more features of the path selected from the group including a curb, a step, a wall, and a drop-off, the memory of the server further storing machine readable instructions executable by the processor to generate the path program to include instructions for controlling the autonomous path treatment robot to treat the path based upon the features.

An autonomous path treatment system designated BC including the system designated B, BA or BB, the memory of the mobile device further storing machine readable instructions executable by the processor to interact with the operator to receive feature information of the path, the feature information defining a location of one or more of a curb, a wall, and a step, together with its location relative to the path.

An autonomous path treatment system designated BD including the autonomous path treatment system designated B, BA, BB, or BC, wherein the mobile path recording device is the autonomous path treatment robot.

An autonomous path treatment robot for treating a path designated C, including a motor driving at least one wheel to maneuver the autonomous path treatment robot along the path; a path treatment device positioned ahead of the motor and wheel for treating the path; a wireless interface for receiving, from a remote server, a path program that includes a sequence of directives; and a controller having a processor and memory storing machine readable instructions that are executed by the processor to cooperatively control the motor and the path treatment device to treat the path based upon the sequence of directives.

An autonomous path treatment robot designated CA including the robot designated C, further including at least one sensor for sensing an environment of the robot to generate sensor data, the memory further storing instructions that when executed by the processor direct the robot to: detect an unexpected obstacle in the path of the robot based upon the sensor data; pause operation of the robot when the unexpected obstacle is detected; send the sensor data corresponding to the unexpected obstacle to the remote server; receive additional directives from the remote server; control the motor based upon the additional directives to maneuver the robot around the unexpected obstacle; and resume operation of the robot to treat the path.

An autonomous path treatment robot designated CB including the robot designated C or CB, the memory further storing instructions that are executable by the processor to: store the additional directives within the memory in association with a first identity or type of the unexpected obstacle; match a subsequent unexpected obstacle to the first identify; and control the motor based upon the additional directives to maneuver the robot around the subsequent unexpected obstacle.

An autonomous path treatment robot designated CC including the robot designated C, CA, or CB, the wireless interface being configured to transmit status information indicative of progress of the autonomous path treatment robot through the sequence of directives.

An autonomous path treatment robot designated CD including the robot designated C, CA, CB, or CC, the wireless interface being configured to transmit status information indicative of operational status of the autonomous path treatment robot.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:
1. An autonomous path treatment system, comprising:
a path capture device that captures location data during travel to define a path;
an autonomous path treatment robot for autonomously treating the path based on a path program;
a server, located remote from the path capture device, and having:
at least one server processor; and
first memory storing machine-readable instructions that, when executed by the at least one server processor, causes the server to:
generate, based upon the location data, the path program defining a sequence of (a) movement directives with coordinate locations and (b) control directives;
send the path program to the autonomous path treatment robot;
receive, from the autonomous path treatment robot at intervals, status information digitally signed using a robot private key and indicative of progress of the autonomous path treatment robot through the path program; and
generate documentation digitally signed by the server that includes the status information as evidence of treatment of the path by the autonomous path treatment robot.

2. The system of claim 1, the autonomous path treatment robot comprising:
- an interface for communicating with the server;
- a plurality of sensors selected from the group comprising a camera, RADAR, LIDAR, infrared, ultrasonic sensor, an inertial platform, a GPS receiver, an accelerometer, a gyroscope, a compass, a proximity sensor, a battery gauge, a fuel gauge, an ambient air temperature sensor, a relative humidity sensor, an atmospheric pressure sensor, an oil level sensor, an engine temperature sensor, and a wheel rotation sensor;
- at least one controllable component for treating the path;
- at least one robot processor;
- second memory storing machine readable instructions that, when executed by the at least one robot processor, control the autonomous path treatment robot to:
  - receive, via the interface, the path program from the server;
  - process data from one or more of the plurality of sensors to determine a current location, orientation, and speed of the autonomous path treatment robot;
  - control movement of the autonomous path treatment robot to follow the path by sequentially actioning the movement directives and the coordinate locations; and
  - control operation of the at least one controllable component based upon the control directives.

3. The system of claim 2, the interface communicating with the server using one or more of a cellular carrier, Wi-Fi, the Internet, a satellite, and Bluetooth.

4. The system of claim 2, the second memory of the autonomous path treatment robot further comprising machine readable instructions that, when executed by the at least one robot processor, control the autonomous path treatment robot to:
- detect, using at least one of the plurality of sensors, an unexpected obstacle in or near the path of the autonomous path treatment robot;
- stop movement of the autonomous path treatment robot; and
- send a message, to the server via the interface, indicating the unexpected obstacle.

5. The system of claim 4, the second memory of the autonomous path treatment robot further comprising machine readable instructions that, when executed by the at least one robot processor, control the autonomous path treatment robot to:
- receive additional directives from the server; and
- control movement of the autonomous path treatment robot based upon the additional directives to maneuver the autonomous path treatment robot around the unexpected obstacle.

6. The system of claim 5, the autonomous path treatment robot further comprising:
- a propulsion mechanism for moving the autonomous path treatment robot;
- a steering mechanism for steering the autonomous path treatment robot;
- the additional directives comprising a sub-program that is stored in the second memory of the autonomous path treatment robot as machine readable instructions that, when executed by the at least one robot processor, control the autonomous path treatment robot to:
  - capture sensor data of the unexpected obstacle from one or more of the plurality of sensors; and
  - activate the propulsion mechanism and the steering mechanism to maneuver the autonomous path treatment robot around the unexpected obstacle while avoiding any collision with the unexpected obstacle or any other object.

7. The system of claim 2, the controlled component comprising one or more of (a) a rotatable brush for clearing snow from the path, (b) a spreader device for treating the path with a granular treatment material, (c) a sprayer device for treating the path with a liquid, and (d) a mower deck for mowing grass on the path.

8. The system of claim 1, the first memory of the server further comprising machine-readable instructions stored in the first memory that, when executed by the at least one server processor, cause the server to:
- validate the status information using a robot public key corresponding to the robot private key, wherein the status information includes at least one image showing a portion of the path prior to treatment and at least one image showing a portion of the path after treatment.

9. The system of claim 8, the status information including an image of an unexpected obstacle preventing the autonomous path treatment robot from treating a portion of the path, wherein the generated documentation includes the image of the unexpected object as a reason why the portion of the path has not been treated.

10. The system of claim 1, the path capture device comprising the autonomous path treatment robot operating under manual control.

11. A method for autonomously treating a path, comprising:
- receiving, at an autonomous path treatment robot from a server, a path program defining a sequence of (a) movement directives with coordinate locations along the path, and (b) control directives for controlling components of the autonomous path treatment robot;
- controlling, based on the movement directives, a propulsion mechanism and a steering mechanism to move the autonomous path treatment robot along the path defined by the coordinate locations;
- controlling, based on the control directives, at least one component of the autonomous path treatment robot to treat the path as the autonomous path treatment robot moves along the path; and
- sending, at intervals, status information digitally signed using a robot private key to the server as evidence of the autonomous path treatment robot treating the path.

12. The method of claim 11, the status information including at least a timestamp, a current location of the autonomous path treatment robot, a current direction of the autonomous path treatment robot, at least one image showing a portion of the path prior to treatment, at least one image showing a portion of the path after treatment, and activity of the components.

13. The method of claim 12, the path program being received, and the status information being sent, via a wireless interface of the autonomous path treatment robot.

14. The method of claim 12, further comprising:
- sensing an unexpected obstacle in or near the path of the autonomous path treatment robot using at least one of a plurality of sensors;
- stopping movement of the autonomous path treatment robot;
- receiving a sub-program from the server in response to the status information indicating the unexpected obstacle;
- controlling movement of the autonomous path treatment robot using the sub-program to maneuver the autonomous path treatment robot around the unexpected obstacle.

15. The method of claim 14, the plurality of sensors being selected from the group comprising a camera, RADAR, LIDAR, infrared, ultrasonic sensor, an inertial platform, a GPS receiver, an accelerometer, a gyroscope, a compass, a proximity sensor, a battery gauge, a fuel gauge, an ambient air temperature sensor, a relative humidity sensor, an atmospheric pressure sensor, an oil level sensor, an engine temperature sensor, and a wheel rotation sensor.

16. The method of claim 12, further comprising:
sensing an unexpected obstacle in or near the path of the autonomous path treatment robot using at least one of a plurality of sensors;
recognizing the unexpected obstacle as being previously encountered; and
controlling movement of the autonomous path treatment robot, based upon a sub-program previously received from the server and corresponding to the unexpected obstacle, to maneuver the autonomous path treatment robot around the unexpected obstacle and back to the path defined by the coordinate locations.

17. The method of claim 16, the plurality of sensors being selected from the group comprising a camera, RADAR, LIDAR, infrared, ultrasonic sensor, an inertial platform, a GPS receiver, an accelerometer, a gyroscope, a compass, a proximity sensor, a battery gauge, a fuel gauge, an ambient air temperature sensor, a relative humidity sensor, an atmospheric pressure sensor, an oil level sensor, an engine temperature sensor, and a wheel rotation sensor.

18. The method of claim 16, further comprising:
sensing, under control of the sub-program, the unexpected obstacle using at least one of the plurality of sensors; and
maneuvering, under control of the sub-program, the autonomous path treatment robot around the unexpected obstacle while avoiding any collision with the unexpected obstacle or any other object and back to the path defined by the coordinate locations.

19. The method of claim 11, the at least one component comprising (a) a rotatable brush for clearing snow from the path, wherein controlling comprises controlling an angle of the rotatable brush to control a direction of discharge of snow, (b) a spreader device for treating the path with a granular treatment material, (c) a sprayer device for treating the path with a liquid, and (d) a mower deck for mowing grass on the path.

* * * * *